(12) United States Patent
Nanivadekar et al.

(10) Patent No.: US 7,882,497 B2
(45) Date of Patent: Feb. 1, 2011

(54) SYMBIOTIC COMPUTER APPLICATION AND SYSTEM AND METHOD FOR GENERATION AND PRESENTATION OF SAME

(75) Inventors: Hemant Nanivadekar, Bellevue, WA (US); J. Michael Constans, Seattle, WA (US); Kingsley Daniel, Bellevue, WA (US); Kalpana Narayanaswamy, Redmond, WA (US)

(73) Assignee: Attachmate Corporation, Bellevue, WA (US)

( * ) Notice: Subject to any disclaimer, the term of this patent is extended or adjusted under 35 U.S.C. 154(b) by 2812 days.

(21) Appl. No.: 09/860,837

(22) Filed: May 17, 2001

(65) Prior Publication Data

US 2004/0015842 A1 Jan. 22, 2004

(51) Int. Cl.
*G06F 9/45* (2006.01)
*G06F 9/40* (2006.01)
*G06G 7/48* (2006.01)
(52) U.S. Cl. .................. 717/138; 703/27; 712/209
(58) Field of Classification Search ................ 717/109
See application file for complete search history.

(56) References Cited

U.S. PATENT DOCUMENTS

| | | | | |
|---|---|---|---|---|
| 5,784,562 A * | 7/1998 | Diener | ....................... | 709/217 |
| 5,961,592 A | 10/1999 | Hsia | ........................... | 709/217 |
| 6,133,915 A * | 10/2000 | Arcuri et al. | ................ | 715/779 |
| 6,223,180 B1 | 4/2001 | Moore et al. | ................ | 707/100 |
| 6,230,309 B1 * | 5/2001 | Turner et al. | ................ | 717/107 |
| 6,268,852 B1 * | 7/2001 | Lindhorst et al. | ........... | 715/744 |
| 6,295,061 B1 * | 9/2001 | Park et al. | ................... | 715/764 |
| 7,024,631 B1 * | 4/2006 | Hudson et al. | ............. | 715/763 |
| 2004/0139430 A1 * | 7/2004 | Eatough et al. | ............ | 717/174 |

FOREIGN PATENT DOCUMENTS

WO WO01/16720 3/2001

OTHER PUBLICATIONS

"Symbiotic," Merriam-Webster Online Dictionary, [online], accessed May 26, 2009, 2 pages.*
Kong et al., "Legacy Interface Migration: A Task-Centered Approach", Aug. 27, 1999, Lawrence Erlbaum Associates, Proceedings of the 8th International Conference on Human-Computer Interaction, pp. 1167-1171.*
Stroulia, E., El-Ramly, M., Kong, L., Sorenson, P., and Matichuk, B. 1999. Reverse Engineering Legacy Interfaces: An Interaction-Driven Approach. In Proceedings of the Sixth Working Conference on Reverse Engineering (Oct. 6-8, 1999). WCRE. IEEE Computer Society, Washington, DC, 292.*
Aho, Sethi, and Ullman, "Compilers: Principles, Techniques, and Tools", 1986, Addison-Wesley, ISBN 0-201-10088-6, Chapters 6-7.*

* cited by examiner

*Primary Examiner*—James D Rutten
(74) *Attorney, Agent, or Firm*—Seed IP Law Group PLLC

(57) ABSTRACT

A system and method for a symbiotic computer application and system and method for generation and presentation of same. The symbiotic computer application allows end-user devices to access back-end data systems including legacy host data systems having legacy host applications and other alternative data systems not directly compatible with the end-user devices. In some embodiments, the symbiotic computer application is generated by a symbiotic computer application generator to include user interface forms and discrete associations, which relate the user interface forms to the back-end data systems. A symbiotic computer application presentation end-user system allows the end-user device to perform desired functions of the back-end data systems through programs and user interfaces configured for the end-user device.

64 Claims, 13 Drawing Sheets

SYMBIOTIC COMPUTER APPLICATION AND SYSTEM AND METHOD FOR GENERATION AND PRESENTATION OF SAME

TECHNICAL FIELD

The invention relates generally to computer applications, systems and methods, and more particularly to computer systems and methods to generate computer applications to operate on one device, such as a computer, to exchange data with another computer application operating on a second device, such as a second computer system.

BACKGROUND OF THE INVENTION

Although information technology must deal with fast paced advances, it must still deal with legacy applications and data that have been inherited from languages, platforms, and techniques originated in an earlier computer era. Most enterprises which use computers have legacy applications and databases that continue to serve critical business needs. A primary example of such legacy applications are found on mainframe host computers, such as International Business Machines (IBM) model 390 mainframe computers and accessed by asynchronous text-based terminals.

A large portion of the computer user community no longer use asynchronous text-based terminals, but rather use graphical user interface (GUI) based personal computers (PCs). Some of these GUI based PCs run text-based terminal emulation programs to access the mainframe host computers. A disadvantage of the text-based terminal emulation programs is that the text-based screens furnished are not as user-friendly as a GUI based display. To address this and other issues some have turned to accessing mainframe host computers through intermediary server computers.

The GUI based PCs form network connections with the server computers and in turn the server computers form network connections with the mainframe host computers. Oftentimes these server computers run screen scraping programs that translate between legacy application programs (written to communicate with now generally obsolete input/output devices and user interfaces) and newer user GUI interfaces so that the logic and data associated with the legacy programs can continue to be used. Screen scraping is sometimes called advanced terminal emulation.

For example, a program that does screen scraping must take the data coming from the legacy program running on a mainframe host computer that is formatted for the screen of a text-based terminal such as an IBM 3270 display or a Digital Equipment Corporation VT100 and reformat it for a Microsoft Windows GUI or a PC based Web browser. The program must also reformat user input from the newer user interfaces (such as a Windows GUI or a Web browser) so that the request can be handled by the legacy application as if it came from a user of the older device and user interface.

First generation advanced terminal emulation systems involve automated conversion of a collection of host terminal screens into a corresponding collection of GUI screens using such presentation languages as HyperText Markup Language (HTML), or languages based on Microsoft Windows GUI or Sun Systems Java GUI.

These first generation systems follow rigid rules for conversion of host screen based data to a GUI format. For example, a conversion of a host screen into a GUI based on HTML would typically include such mandatory conversion operations as all host screen fields having a protected status being converted to an HTML text that was static in nature, all unprotected host screen fields being converted to HTML input boxes and certain keywords on the host screen such as "PF1", "PF2", etc. being converted to GUI based buttons. The first generation systems fall short in addressing many needs in presenting and processing data of the legacy host systems as well as other systems due to the lack of flexibility, among other things, of the first generation systems. Legacy host systems include systems from International Business Machines, Sperry-Univac, Wang, Digital Equipment Corporation, Hewlett Packard, and others.

To address this lack of facility of the first generation systems, second generation advanced terminal emulation systems allow a certain degree of customization of the conversion process and resulting GUIs. The customization process, however, is very manually intensive. Typically applications are written in a preferred environment such as Visual Basic, PowerBuilder, Visual C++ and Delphi by associating a set of controls provided by the second generation system to a recording of session screens of a host system. Many of the controls are tightly coupled to particular fields of the host screens.

As an unfortunate consequence, GUI developers using first and second generation systems must spend a great deal of time becoming familiar with the terminal screens of legacy host systems. Other time is spent in manually relating various aspects of the host terminal screens with the resultant GUIs. Also, since the resultant GUIs of the first and second generation systems are still backwardly focused on the host terminal screens, integration of data from other systems not involving terminal screens and generation of presentation systems not involving GUIs may be difficult if not impossible for the first and second generation systems to accomplish.

Regarding presentation systems not involving GUIs, another trend in the computer user community is to use communication devices and other processing devices that directly or indirectly communicate with computer systems such as legacy host systems. Many of these devices tend to be portable and tend to communicate over wireless means. Oftentimes these devices are not GUI based, but since they are also not based upon a legacy terminal screen, issues arise that are similar with those discussed above with respect to generating applications to work with legacy host systems and other data providing systems. With regard to generation and operation of both GUI and non-GUI applications, it would be desirable to improve upon the shortcomings experienced with regard to the first and second generation systems discussed above.

SUMMARY OF THE INVENTION

Aspects of the present invention reside in a method and system for a symbiotic computer application designer for generating symbiotic computer applications for communication between an end-user device having an input and an output and a back-end data system having a back-end application. Aspects of the system and method include a user interface form generator and a task object generator. In some embodiments, the user interface form generator is configured to receive and analyze data system navigation recordings associated with the back-end application. Default user interface forms are generated based upon predefined procedures to process the data system navigation recordings including those related to output screens, other output segments, and screen transitions of the back-and data system. The default user interface forms are configured to operate with the end-user device to present controls and data fields to the output of the end-user device and to receive data from the input of the end-user device.

In some embodiments, the task object generator is configured to generate task objects to respond to input from the end-user device, to transmit data to the back-end data system and to receive data from the back-end data system. Each of the task objects have one or more task object inputs, task object outputs, and transfer functions. The transfer functions are configured to operate on the task object inputs to result in the task object outputs. Some of the plurality of task objects have one or more first discrete associations with one or more of the default user interface forms. The first discrete associations include receiving data from one or more of the default user interface forms as one or more of the task object inputs and include sending data to one or more of the default user interface forms as one or more of the task object outputs. Some of the task objects have one or more second discrete associations with the back-end application including receiving data from the back-end application as one or more of the task object inputs and sending data to the back-end application as one or more of the task object out puts.

Further aspects include the task object generator generating task objects based upon at least one of the following: the controls and data fields of the default user interface forms generated by the user interface form generator and the data system navigation recordings including those related to the output screens and screen transitions of the back-end data system, and developer input. Some embodiments include the user interface form generator generating the default user interface forms to operate with the audio output. Other aspects include the user interface form designer configured to generate input based user interface forms based upon developer input and previously generated default user interface forms received by the default user interface form designer.

Further aspects include the task object generator configured to generate task objects based upon the analysis of the screen transition analyzer. A user interface form designer is configured to modify the default user interface forms based upon developer input. A symbiotic computer application packager is configured to package the default user interface forms and task objects into a symbiotic computer application template.

Further aspects include methods for generating symbiotic computer applications for communication between an end-user device having an input and an output and a back-end application including generating a plurality of user interface forms based upon developer input regarding placement on the user interface forms of controls and data fields, generating a plurality of task objects based upon controls and data fields of the plurality of the user interface forms, and packaging the plurality of task objects and the plurality of user interface forms into a symbiotic computer application template.

Further aspects include a symbiotic computer application for communication between an end-user device having an input and an output and a back-end data system having a back-end application, the symbiotic computer application including a symbiotic computer application runtime engine and a symbiotic computer application presentation end-user system. The symbiotic computer application runtime engine has a symbiotic computer application storage configured to store one or more symbiotic computer applications. Each of the symbiotic computer applications contain user interface forms and task objects. The symbiotic computer application presentation end-user system has a user interface forms rendering system communicatively linked to the input and the output of the end-user device and operating on the end-user device to render the user interface forms for presentation of the user interface forms on the output of the end-user device and for receipt of data through the user interface forms from the input of the end-user device.

Further aspects include the symbiotic computer application runtime engine configured to operate on a server computer communicatively linked to the end-user device and communicatively linked to the back-end data system. In some embodiments, each of the plurality of task objects has one or more transfer functions selected from the following: a data throughput operation, a data verification operation, an operation that generates screen transition instructions to the back-end application, an operation to establish communication between the end-user device and the back-end data system and an operation to discontinue communication between the end-user device in the back-end data system.

Further aspects include a method for communicating between an end-user device having an input and output and a back-end data system having a back-end application including receiving a presentation request from the end-user device, retrieving a plurality of user interface forms based upon the presentation request, retrieving a plurality of task objects based upon the presentation request, executing one or more the plurality of task objects to establish a communication link to the back-end data system, designating one more the plurality of user interface forms as being a current user interface form, transmitting the current user interface form to the end-user device for presentation by the output of the end-user device, receiving an execution requests from the end-user device, and executing one or more of the plurality of task objects based upon the received execution request to perform at least one of the following: sending data to the back-end data system and receiving data from the back-end data system.

Further aspects include a method for communicating between an end-user device having an input and an output and a back-end data system having a back-end application including generating a presentation request by the end-user device, determining availability of local user interface forms stored on the end-user device to service the presentation request, determining availability of the local task object stored on the end-user device to service the presentation request, based upon determining availability of local user interface forms and availability of the local task objects, sending a modified presentation request configured in part to cause one or more task object to establish a communication link to the back-end data system, receiving a user interface form designated as a current user interface for presentation by the output of the end-user device based upon the modified presentation request, and sending an execution request from the end-user device for one or more task objects to perform one of the following: sending data to the back-end data system and receiving data from the back-end data system.

Other features and advantages of the invention will become apparent from the following detailed description, taken in conjunction with the accompanying drawings.

DETAILED DESCRIPTION OF THE INVENTION

Figure 1:
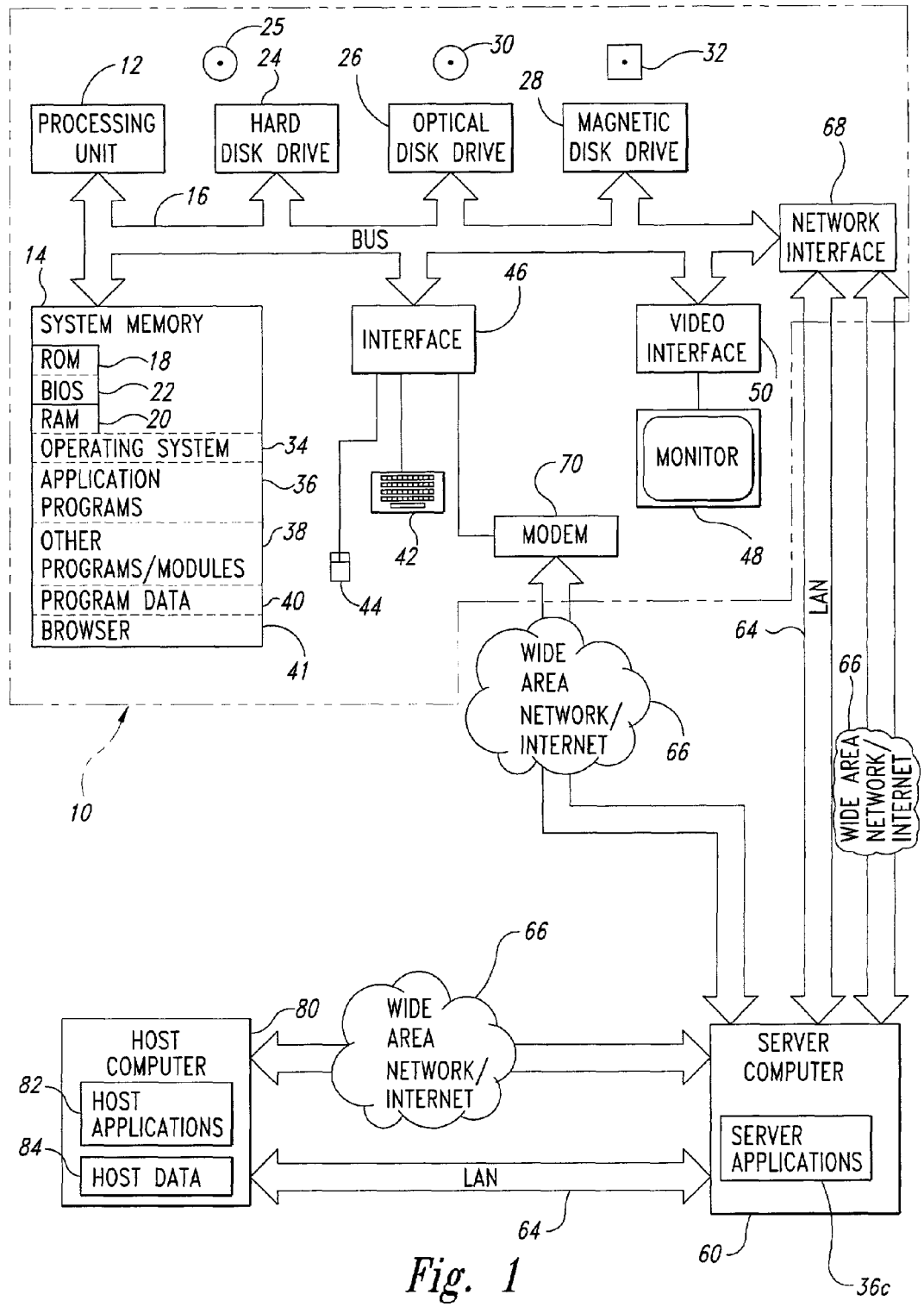
FIG. 1 is a schematic diagram of a computing system suitable for employing aspects of the present invention for secure, duplex browser communication.

Embodiments of a symbiotic computer application and a system and method for generation and presentation of the symbiotic computer application are described. Embodiments of the symbiotic computer applications are generated by embodiments of a symbiotic computer application generator to contain user interface forms and discrete associations, which relate the user interface forms to back-end data systems including legacy host data system having back-end applications legacy host applications and alternative data systems that are not as readily apparent to the end-users.

The user interface forms are used by embodiments of a symbiotic computer application presentation end-user system of an end-user device for front-end user interface presentations to end-users so that the end-user device can perform desired functions through the use of the back-end data systems through a user interface form configured for an end-user device instead of the back-end data systems. Due in part to the discrete associations, the symbiotic computer applications are more than extensions of terminal screens of legacy host systems found with the first and second generation advanced terminal emulation systems described above.

Embodiments of the symbiotic computer application generator generates task objects to implement the discrete associations. Task objects are generalized forms of enterprise data objects having one or more task object inputs, one or more task object outputs, and one or more transfer functions to process the input to result in the output. They can, in general, perform a wide range of tasks involving legacy host applications or other data providing systems. For instance, a particular task object can be used to instruct a legacy host application to transition between two host screens, or a particular task object can be used to connect a session, disconnect a session, or verify if input data is numeric. A task object could receive input data or properties, perform operations and processes, and output data and properties. Other times a task object could simply act as a throughput to pass data rather than processing the data. Task objects can typically be written in an extensible markup language (XML), wireless markup language (WML), a scripting language for a script file, a Java class code, binary code, or other languages known in the art.

To generate task objects associated with host screen transitions, embodiments of the symbiotic computer application generator utilize navigation recordings of the host screens and transitions between the host screens for legacy host applications. These navigation recordings for legacy host applications are produced by conventional screen navigation systems that record both host screens and transitions between the host screens of the legacy host applications. Oftentimes, the symbiotic computer application generator can be automated to produce task objects based upon its analysis of the navigation recordings. Embodiments of the symbiotic computer application generator can also be automated to generate task objects associated with other alternate data systems. Other times the task objects may be customized, at least in part, by a developer due to particular features or other aspects of an alternate data system such as a spreadsheet application, a database application, a calculation application, an evaluation application, or a file transfer application.

Embodiments of the symbiotic computer application generator also include user interface forms, which are used by embodiments of the symbiotic computer application presentation end-user system to generate user interface presentations to end-users. The user interface forms can be automatically generated based upon a navigation recording or other indicators of the particular back-end data system if available according to predefined rules, but a developer can also customize one or more of the user interface forms for particular situations or can change the predefined rules as well.

The controls and data fields of the user interface forms of the symbiotic computer application are then bound by the symbiotic computer application generator to the controls and data fields of the host screens of one or more legacy host applications or other alternate data systems via the task objects. First the controls and data fields of the user interface forms are associated with the tasks objects.

Once a particular symbiotic computer application is generated, more customization can occur such as further customization of the user interface forms, customization of the task object input and output properties, and further combining of single task objects to create custom user interface forms to handle multi-screen tasks.

In the following description, numerous specific details are provided to understand embodiments of the invention. One skilled in the relevant art, however, will recognize that the invention can be practiced without one or more of these specific details, or with other equivalent elements and components, etc. In other instances, well-known components and elements are not shown, or not described in detail, to avoid obscuring aspects of the invention or for brevity. In other instances, the invention may still be practiced if steps of the various methods described could be combined, added to, removed, or rearranged.

FIG. 1 and the following discussion provide a brief, general description of a suitable computing environment in which embodiments of the invention can be implemented. Although not required, embodiments of the invention will be described in the general context of computer-executable instructions, such as program application modules, objects, or macros being executed by a personal computer. Those skilled in the relevant art will appreciate that the invention can be practiced with other computer system configurations, including handheld devices, multiprocessor systems, microprocessor-based or programmable consumer electronics, network PCs, mini computers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 1, a conventional personal computer, referred to herein as a client computer 10, includes a processing unit 12, a system memory 14 and a system bus 16 that couples various system components including the system memory to the processing unit. The client computer 10 will at times be referred to in the singular herein, but this is not intended to limited the application of the invention to a single client computer since in typically embodiments, there will be more than one client computer or other device involved. The processing unit 12 may be any logic processing unit, such as one or more central processing units (CPUs), digital signal processors (DSPs), application-specific integrated circuits (ASICs), etc. Unless described otherwise, the construction and operation of the various blocks shown in FIG. 1 are of conventional design. As a result, such blocks need not be described in further detail herein, as they will be understood by those skilled in the relevant art.

The system bus 16 can employ any known bus structures or architectures, including a memory bus with memory controller, a peripheral bus, and a local bus. The system memory 14 includes read-only memory ("ROM") 18 and random access memory ("RAM") 20. A basic input/output system ("BIOS") 22, which can form part of the ROM 18, contains basic routines that help transfer information between elements within the client computer 10, such as during start-up.

The client computer 10 also includes a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers (not shown) coupled between such drives and the bus 16, as is known by those skilled in the relevant art. The drives 24, 26 and 28, and their associated computer-readable media, provide nonvolatile storage of computer readable instructions, data structures, program modules and other data for the client computer 10. Although the depicted client computer 10 employs hard disk 25, optical disk 30 and magnetic disk 32, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 14, such as an operating system 34, one or more application programs 36, other programs or modules 38 and program data 40. The system memory 14 also includes a browser 41 for permitting the client computer 10 to access and exchange data with sources such as web sites of the Internet, corporate intranets, or other networks as described below, as well as other server applications on server computers such as those further discussed below. The browser 41 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the client computer 10 as a personal computer, in other embodiments, the client computer is some other computer related device such as a personal data assistant (PDA) or a cell phone or other mobile device.

While shown in FIG. 1 as being stored in the system memory 14, the operating system 34, application programs 36, other programs/modules 38, program data 40 and browser 41 can be stored on the hard disk 25 of the hard disk drive 24, the optical disk 30 of the optical disk drive 26 and/or the magnetic disk 32 of the magnetic disk drive 28. A user can enter commands and information into the client computer 10 through input devices such as a keyboard 42 and a pointing device such as a mouse 44. Other input devices can include a microphone, joystick, game pad, scanner, etc. These and other input devices are connected to the processing unit 12 through an interface 46 such as a serial port interface that couples to the bus 16, although other interfaces such as a parallel port, a game port or a wireless interface or a universal serial bus ("USB") can be used. A monitor 48 or other display device is coupled to the bus 16 via a video interface 50, such as a video adapter. The client computer 10 can include other output devices, such as speakers, printers, etc.

The client computer 10 can operate in a networked environment using logical connections to one or more remote computers, such as a server computer 60. The server computer 60 can be another personal computer, a server, another type of computer, or a collection of more than one computer communicatively linked together and typically includes many or all of the elements described above for the client computer 10. The server computer 60 is logically connected to one or more of the client computers 10 under any known method of permitting computers to communicate, such as through a local area network ("LAN") 64, or a wide area network ("WAN") or the Internet 66. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a LAN networking environment, the client computer 10 is connected to the LAN 64 through an adapter or network interface 68 (communicatively linked to the bus 16). When used in a WAN networking environment, the client computer 10 often includes a modem 70 or other device, such as the network interface 68, for establishing communications over the WAN/Internet 66. The modem 70 is shown in FIG. 1 as communicatively linked between the interface 46 and the WAN/Internet 66. In a networked environment, program modules, application programs, or data, or portions thereof, can be stored in the server computer 60. In the depicted embodiment, the client computer 10 is communicatively linked to the server computer 60 through the LAN 64 or the WAN/Internet 66 with TCP/IP middle layer network protocols; however, other similar network protocol layers are used in other embodiments. Those skilled in the relevant art will readily recognize that the network connections shown in FIG. 1 are only some examples of establishing communication links between computers, and other links may be used, including wireless links.

The server computer 60 is further communicatively linked to a legacy host data system 80 typically through the LAN 64 or the WAN/Internet 66 or other networking configuration such as a direct asynchronous connection (not shown). Other embodiments may support the server computer 60 and the legacy host data system 80 by one computer system by operating all server applications and legacy host data system on the one computer system. The legacy host data system 80 in an exemplary embodiment is an International Business Machines (IBM) 390 mainframe computer configured to support IBM 3270 type terminals. Other exemplary embodiments use other vintage host computers such as IBM AS/400 series computers, UNISYS Corporation host computers, Digital Equipment Corporation VAX host computers and VT/Asynchronous host computers as the legacy host data system 80. The legacy host data system 80 is configured to run host applications 82 such as in system memory and store host data 84 such as business related data.

An exemplary embodiment of the invention is implemented in the Sun Microsystems Java programming language to take advantage of, among other things, the cross-platform capabilities found with the Java language. For instance, exemplary embodiments include the server computer 60 running Windows NT, Win2000, Solaris, or Linux operating systems. In exemplary embodiments, the server computer 60 runs Apache Tomcat/Tomcat Jakarta web server or Microsoft Internet Information Server (ISS) web server, or BEA Weblogic web server.

Apache is a freely available Web server that is distributed under an "open source" license and runs on most UNIX-based operating systems (such as Linux, Solaris, Digital UNIX, and AIX), on other UNIX/POSIX-derived systems (such as Rhapsody, BeOs, and BS2000/OSD), on AmigaOS, and on Windows NT/95/98. Windows-based systems with Web servers from companies such as Microsoft and Netscape are alternatives, but Apache web server seems suited for enterprises and server locations (such as universities) where UNIX-based systems are prevalent. Other embodiments use other web servers and programming languages such as C, C++, and C#.

An exemplary embodiment of a symbiotic computer application will now be discussed with reference to FIG. 2 in the context of a legacy host application 210 used to perform functions related to banking. Typical with conventional legacy host applications, legacy host application 210 begins a terminal session by starting a session connection 210a and displays a Screen A 212a once the session connection 210a is established. A user enters login information associated with the Screen A 212a whereupon the legacy host application 210 invokes transition 210b to Screen B 212b. Further transitions (210b-210n) occur between Screen A through Screen G (212a-212g) of the legacy host application 210 as the user enters data into zero or more fields and presses an input key /such as "Enter", "F1", "Clear", "PA1", etc. From one or more of the Screen A through Screen G (212a-212g) the host session can be terminated such as through disconnect 210o or disconnect 210p, which is followed by an "End" state.

Figure 2:
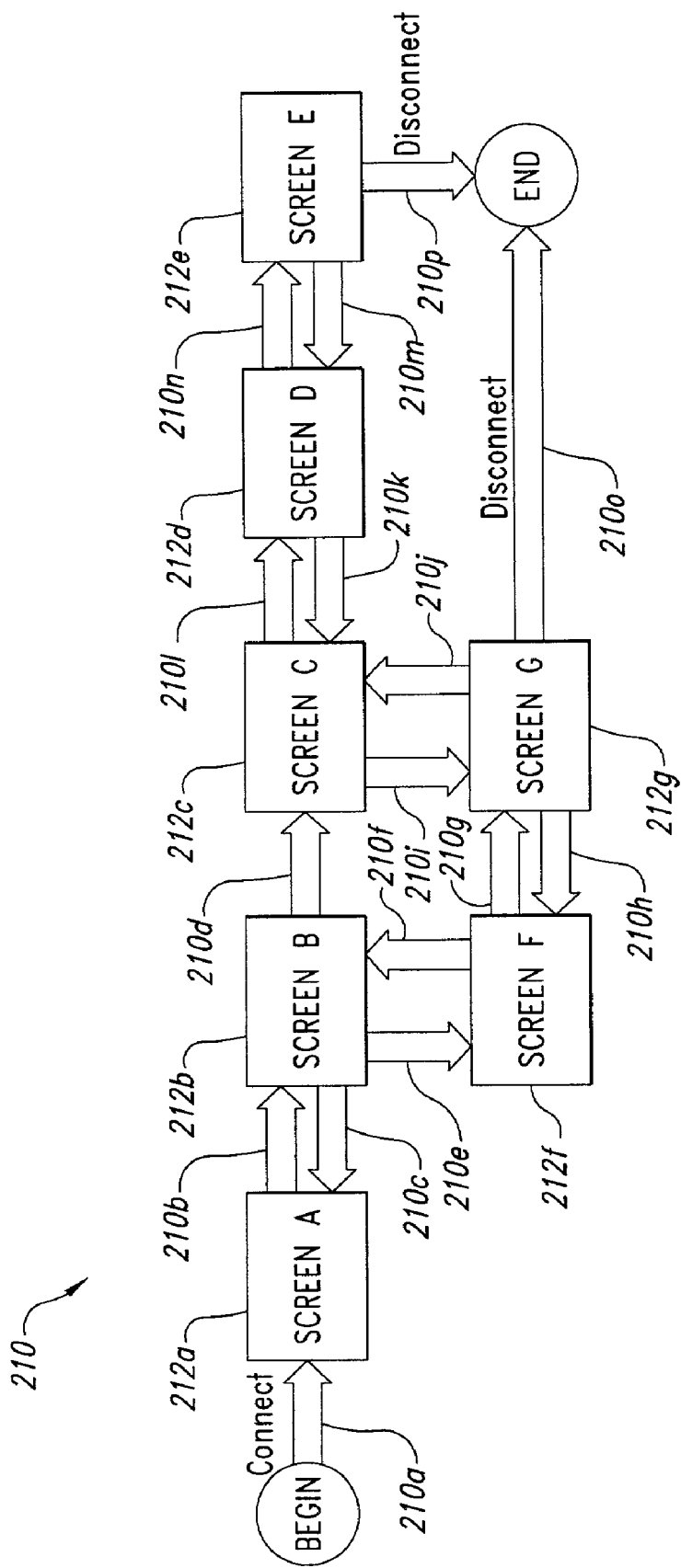
FIG. 2 is transition diagram of screen transitions associated with a conventional legacy host application.
Figure 3:
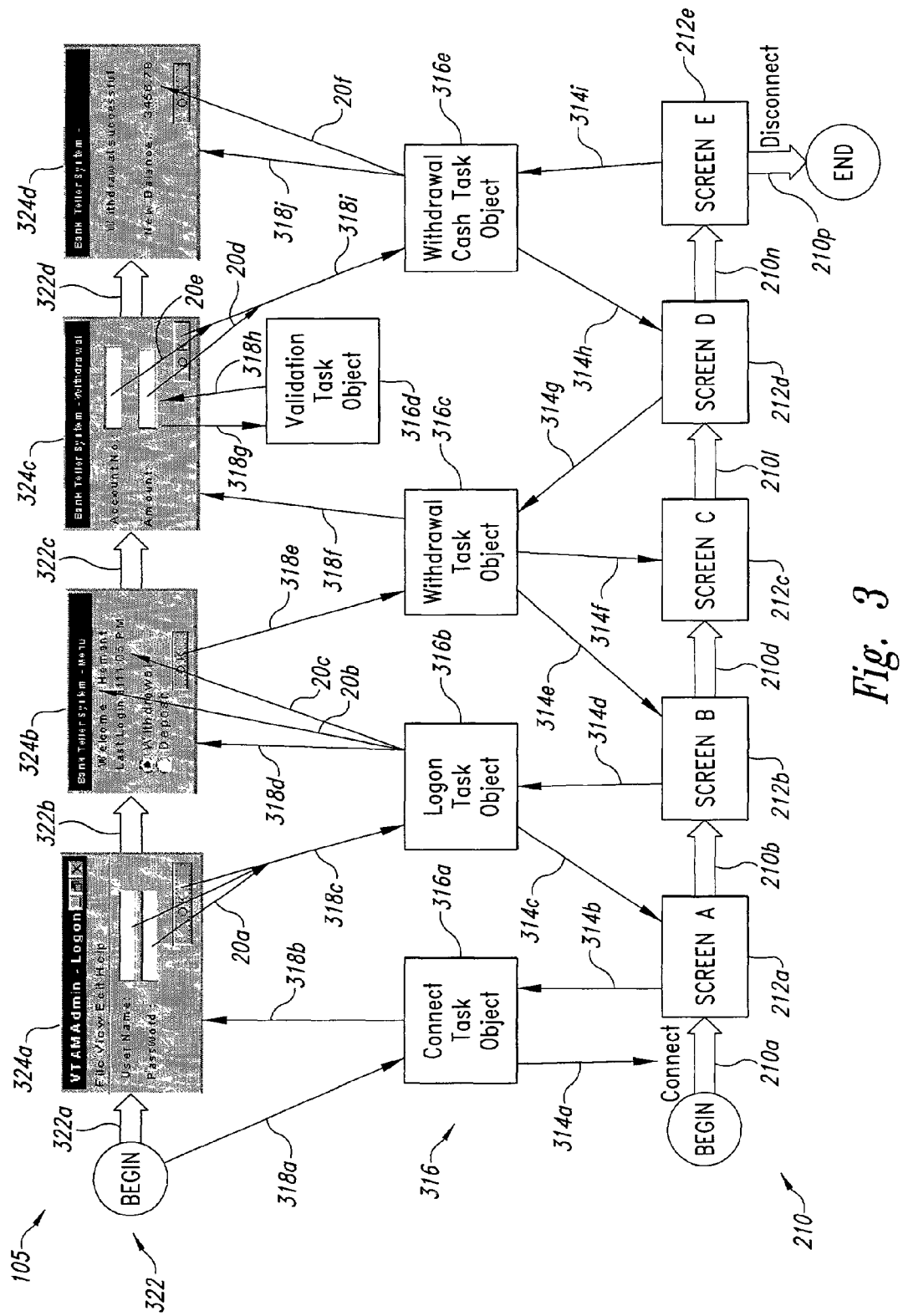
FIG. 3 is a transition diagram showing intra-application associations between internal components of an exemplary symbiotic computer application of the present invention and associations between the symbiotic computer application and the conventional legacy host application of FIG. 2.

Intra-application associations between internal components of an exemplary symbiotic computer application of a depicted embodiment of the present invention and associations between the symbiotic computer application and the legacy host application of FIG. 2 are shown in FIG. 3. The exemplary symbiotic computer application 105 has a task object level 316 with task objects 316a-316e and a user interface level 322 with user interface forms 324a-324d.

At the user interface level 322, an end-user inputs a begin request, which results in a begin instruction 318a being sent to a "Connect" task object 316a and in a transition 322a occurring to a "logon" user interface form 324a. The "Connect" task object 316a then sends a connect instruction 314a to the legacy host application 210, which initiates the session connection 210a. Once the connection 210a is made, the legacy host application 210 transitions to the Screen A 212a for login. A login transmission 314b is sent to the "Connect" task object 316a and is then passed on as communication 318b by the "Connect" task object to the user interface level 322 of the symbiotic computer application.

Once the communication 318b is received at the user interface level 322, the symbiotic computer application presentation end-user system displays the "logon" user interface form 324a based upon a corresponding user interface form.

The symbiotic computer application is generated such that the "User Name" and "Password" fields of the "logon" user interface form 324a are associated as input parameters to a "logon" task object 316b. Consequently, once user information is entered into the "User Name" and "Password" fields and the "OK" button is activated on the "logon" user interface form 324a, user information 318c is sent to the "logon" task object 316b. The "logon" task object 316b passes the user information 318c to the Screen A 212a of the legacy host application 210 in transmission 314c. After a successful logon, the legacy host application 210 then performs a transition 210b from the Screen A 212a to the Screen B 212b. The Screen B 212b provides information for a general welcome menu allowing selection between a withdrawal service and a deposit service.

Welcome information 314d reflecting the successful logon and display of the welcome menu of Screen B 212b is then sent from the legacy host application 210 to the "logon" task object 316b. The welcome information 314d is passed on as communication 318d by the "logon" task object 316b to the user interface level 322 of the symbiotic computer application, which results in a transition 322b from the "logon" user interface form 324a to a "welcome" user interface form 324b having "withdrawal" and "deposit" menu selections. In generation of the symbiotic computer application, associations are made between the "logon" task object 316b and the "welcome" user interface form 324b so that the "logon" task object 316b passes on to the "welcome" user interface form as part of the communication 318d the name of the user and the user's last login time as found in the welcome information receive by the "logon" task object.

In the depicted embodiment, as illustrated in FIG. 3, the "withdrawal" menu selection is chosen on the "welcome" user interface form 324b and subsequently, the "OK" button on the "welcome" user interface form is activated causing welcome menu selection information 318e to be transferred to the "withdrawal" task object 316c. The "withdrawal" task object 316c then sends a series of two transition instructions 314e and 314f to the legacy host application 210 so that the legacy host application performs transition 210d from Screen B 212b to Screen C 212c and performs transition 2101 from Screen C 212c to Screen D 212d. This multiple screen transition is an example of how use of task objects easily allows for variation in association between the user interface forms and the legal host screens. Once the legacy host application 210 reaches the Screen D 212d, confirmation information 314g is sent to the "withdrawal" task object 316c. Upon receipt of the confirmation information 314g, the "withdrawal" task object 316c passes the confirmation information 318f to the user interface level 322 of the symbiotic computer application, which causes transition 322c from the "welcome" user interface form 324b to the "withdrawal" user interface form 324c.

Entering of an account number and a dollar amount into the appropriate fields found in the "withdrawal" user interface form 324c causes information 318g regarding the entered dollar amount and account number to be sent to a validation task object 316d, which assesses the validity of the information. Upon successful validation, the validation task object 316d sends a confirmation notice 318h to the "withdrawal" user interface form 324c, which allows the "OK" button of the "withdrawal" user interface form to be activated.

Upon activation of the "OK" button, the "withdrawal" user interface form sends a withdrawal instruction 318i containing account and dollar amount information to the "withdraw cash" task object 316e, which sends a withdrawal instruction 314h on to the Screen D 212d of the legacy host application 210 to enter the withdrawal amount and account information into the appropriate fields found in the Screen D of the legacy host application. The "withdraw cash" task object 316e also passes on the appropriate activation instruction as part of the withdrawal instruction 314h equivalent to pressing an "Enter" key on a legacy terminal keyboard. Upon receiving the withdrawal instruction 314h from the "withdraw cash" task object 316e, the legacy host application 210 performs the appropriate withdrawal and then performs a transition 210n from the Screen D 212d to the Screen E 212e to signal successful accomplishment of the withdrawal request and to indicate the new balance of the account.

The legacy host application 210 sends new balance information 314i to the "withdraw cash" task object 316e, and if appropriate, causes a disconnect 210p to occur thereby ending the current session with the legacy host application. Upon receiving the new balance information 314i from the legacy host application 210, the "withdraw cash" task object 316e sends a confirmation 318j to the user interface level 322 causing a transition 322d from the "withdrawal" user interface form 324c to the "withdrawal successful" user interface form 324d. The "withdraw cash" task object 316e also sends the new account balance 20f to the user interface level 322 causing the "withdrawal successful" user interface form 324d to display the new balance.

Figure 4:
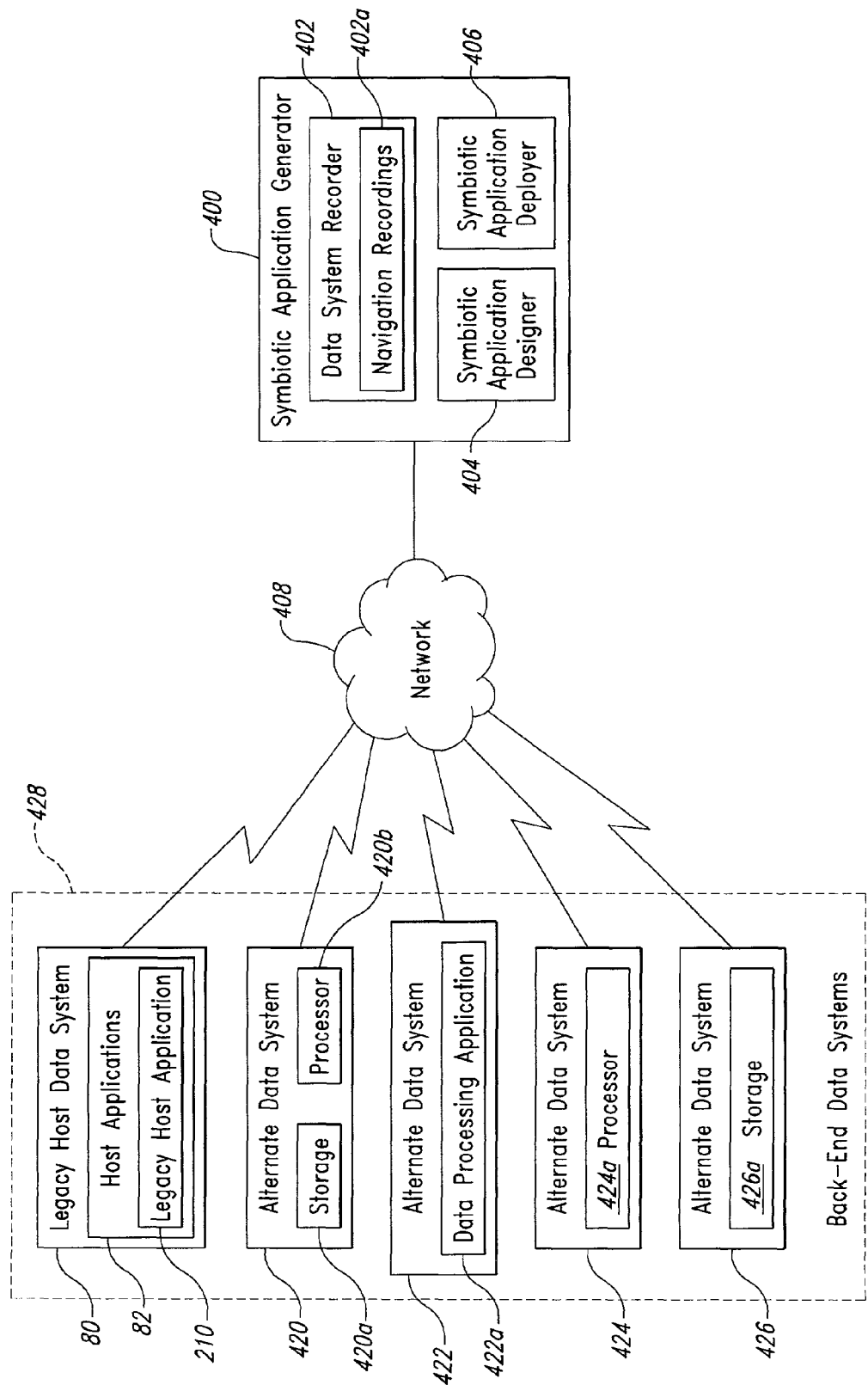
FIG. 4 is a schematic diagram of a symbiotic computer application generator of the present invention found in a typical network environment.

An embodiment of the symbiotic computer application generator 400 is shown in block diagram form in FIG. 4 having a data system recorder 402 for capturing characteristics of one or more back-end data systems, a symbiotic computer application designer 404 for designing and generating the symbiotic computer application 105 (one embodiment shown in FIG. 3), and a symbiotic computer application deployer 406 for deploying the symbiotic computer application as explained further below. The symbiotic computer application generator 400 is communicatively linked to a network 408, such as the LAN 64 or WAN/Internet 66 of FIG. 1 or other communication network.

Also linked to the network 408 are representative back-end data systems 428 including the legacy host data system 80 having an embodiment of the legacy host application 210, an alternate data system 420 having a storage 420a to store data and a processor 420b to process data, an alternate data system 422 having a data providing application 422a, an alternate data system 424 having a processor 424a to process data, and an alternate data system 426 having storage 426a to store data. The back-end data systems 428 operate in conjunction with the symbiotic computer application 105 to provide data to the symbiotic computer application and to receive data from the symbiotic computer application.

Figure 5:
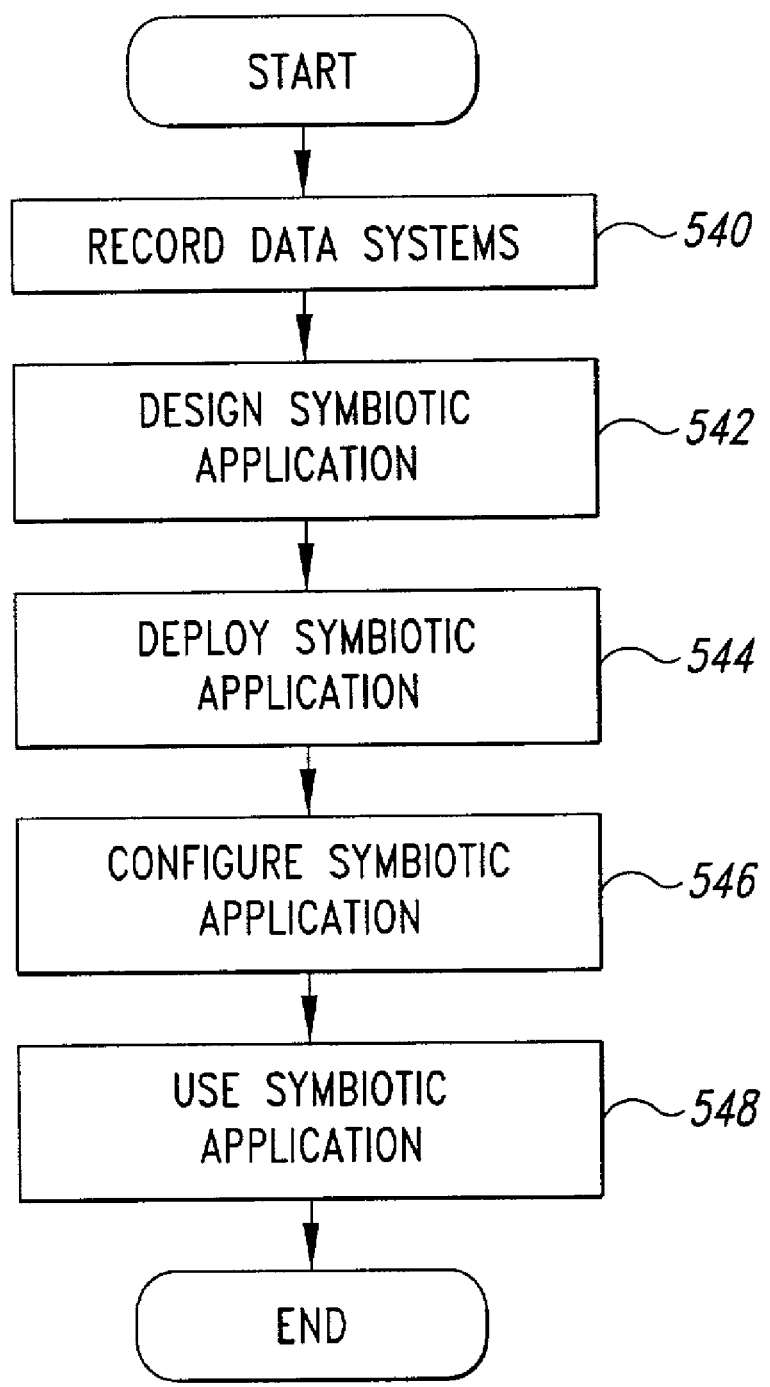
FIG. 5 is a flow chart illustrating an overall process to include both generation and use of an exemplary symbiotic computer application of the present invention.

An overall process flow chart is shown in FIG. 5 having generalized steps including both generation and use of the symbiotic computer application 105. Those back-end data systems that can be recorded with recording applications such as found in conventional applications are recorded (step 540) by the data system recorder 402 to generate associated navigation recordings. Using conventional capabilities, a navigation recording is produced by the data system recorder 402 of the symbiotic computer application generator 400 during a communication session, such as an emulation session, with the legacy host data system 80 running the legacy host application 210. During the communication session the data system recorder 402 produces a navigation recording of the attributes associated with the host screens of the legacy host application 210 such as screen layout, screen content, and transitions between screens including required keystrokes and other end-terminal related input, such as mouse input, to transition between the host screens. Conventional products used to produce navigation recordings of host applications include QuickApp manufactured by Attachmate Corporation of Bellevue, Wash.

Figure 6:
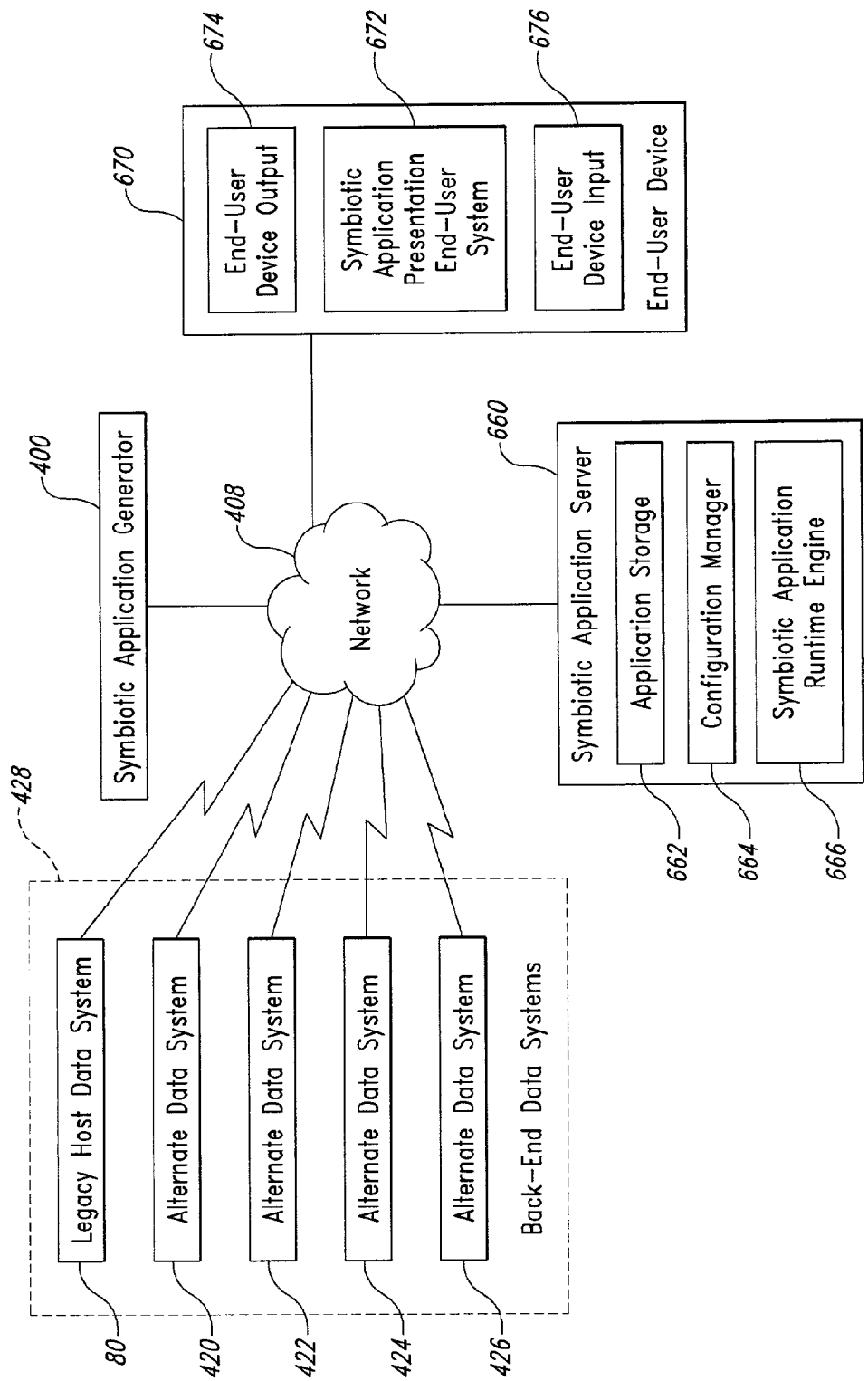
FIG. 6 is a schematic diagram of the symbiotic computer application generator of FIG. 4 found in the typical network environment along with a symbiotic computer application server and an end-user device of the present invention.

Available navigation recordings and other input explained further below are used by the symbiotic computer application designer 404 to design and generate (step 542) the symbiotic computer application 105 in a template version, which means that it has not been configured by an administrator for a particular runtime environment. After the template version of the symbiotic computer application 105 is designed and generated, it is deployed (step 544) by the symbiotic computer application deployer 406 to a symbiotic computer application server 660, shown in FIG. 6. The template version of the symbiotic computer application 105 can be deployed either by pushing by the deployer 406 or pulling by the symbiotic computer application server 660 of the template version from the symbiotic computer application deployer to the symbiotic computer application server. Deployment involves moving the whole template version of the symbiotic computer application 105 with all of its user interface forms and task objects from the symbiotic computer application generator 400 to the symbiotic computer application server 660. As shown in FIG. 6, the symbiotic computer application server 660 has an application storage 662, a configuration manager 664, and a symbiotic computer application runtime engine 666.

The application storage 662 can store both template and configured versions of the symbiotic computer application 105. Referring to FIGS. 5 and 6, the configuration manager 664 allows configuration of the template of the symbiotic computer application (step 546) for a particular runtime environment to address variations in controls such as types of menus or buttons used, functionality provided in a particular setting, tailored treatment of designated fields such as how some fields should be filled in with fixed data, particular user access rights, type of software language (such as Hypertext Markup Language, Wireless Markup Language, Java by Sun Systems Inc., or Visual Basic by Microsoft Corporation) used to present the symbiotic computer application and type of communication connections between the symbiotic computer application server 660 and the back-end data systems 428.

The symbiotic computer application runtime engine 666 is configured to run the symbiotic computer application for use (step 548) by an end-user with an end-user device having a symbiotic computer application presentation end-user system 672, an end-user device output 674, and an end-user device input 676. The symbiotic computer application presentation end-user system 672 handles communication with the symbiotic computer application runtime engine 666 of the symbiotic computer application server 660 and presentation of the symbiotic computer application 105 to the end-user through the end-user device output 674. In some embodiments the symbiotic computer application presentation end-user system 672 originates with the end-user device 670 whereas in other embodiments, substantial portions of the symbiotic computer application presentation end-user system 672 is loaded from the symbiotic computer application runtime engine 666 or other sources on an as needed basis into the end-user device.

Embodiments of the loadable symbiotic computer application presentation end-user system 672 are designed to operate in conjunction with the operating system of the end-user device 670. For instance, if the end-user device 670 does not originally support Java, part of the loadable symbiotic computer application presentation end-user system 672 may have code to enable support of the end-user device of Java whereas other loadable embodiments may have the symbiotic computer application presentation end-user system 672 written with languages originally supported by the end-user device. Some loadable embodiments of the symbiotic computer application presentation end-user system 672 include applet forms that are configured to run in a browser environment. Other loadable embodiments of the symbiotic computer application presentation end-user system 672 include those contained in portable storage devices, such as flash memory cards, that can be inserted in the end-user device. With some of the loadable embodiments, the symbiotic computer application presentation end-user system 672 is configured to operate with other applications of the end-user device 670. One objective in using some loadable embodiments of the symbiotic computer application presentation end-user system 672 is to reduce the number of versions of the symbiotic computer application presentation end-user system necessary to support a wide variety of end-user devices 670.

The end-user device input 676 receives input from the end-user such as through the keyboard 42 and the mouse 44 (see FIG. 1), or other manual entry devices or other voice entry devices. The end-user device 670, in many embodiments, has a GUI, as displayed by the monitor 48 (see FIG. 1), that is either web-based, Java-based, of native format, or of some other format for the end-user device output 674, however, other embodiments of the end-user device are other than to the client computer 10 including wireless devices such as cellular communication devices, which do not have a GUI for the end-user output. For instance, in some embodiments the end-user device output 674 generates audio signals for the end-user and in other embodiments, the end-user device output solely uses textual symbols or other kinds of symbols that does not require a GUI formatted output. Applications for the end-user device 670 includes, but is not limited to personal computers, workstation computers, personal digital assistants, cell phones, and audio-only devices.

Figure 7:
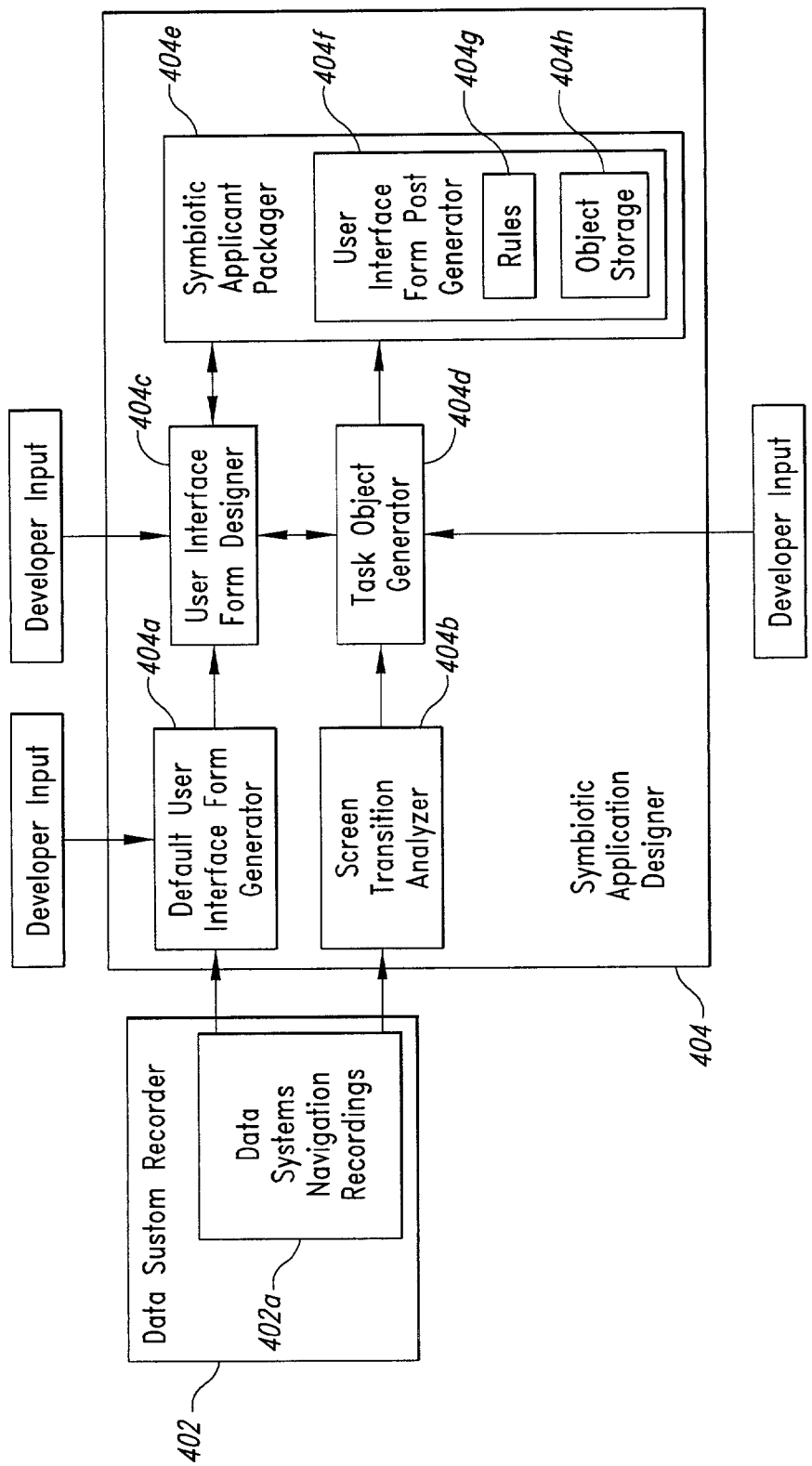
FIG. 7 is a schematic diagram showing further details of a symbiotic computer application designer of the symbiotic computer application generator shown in FIG. 4.
Figure 8A:
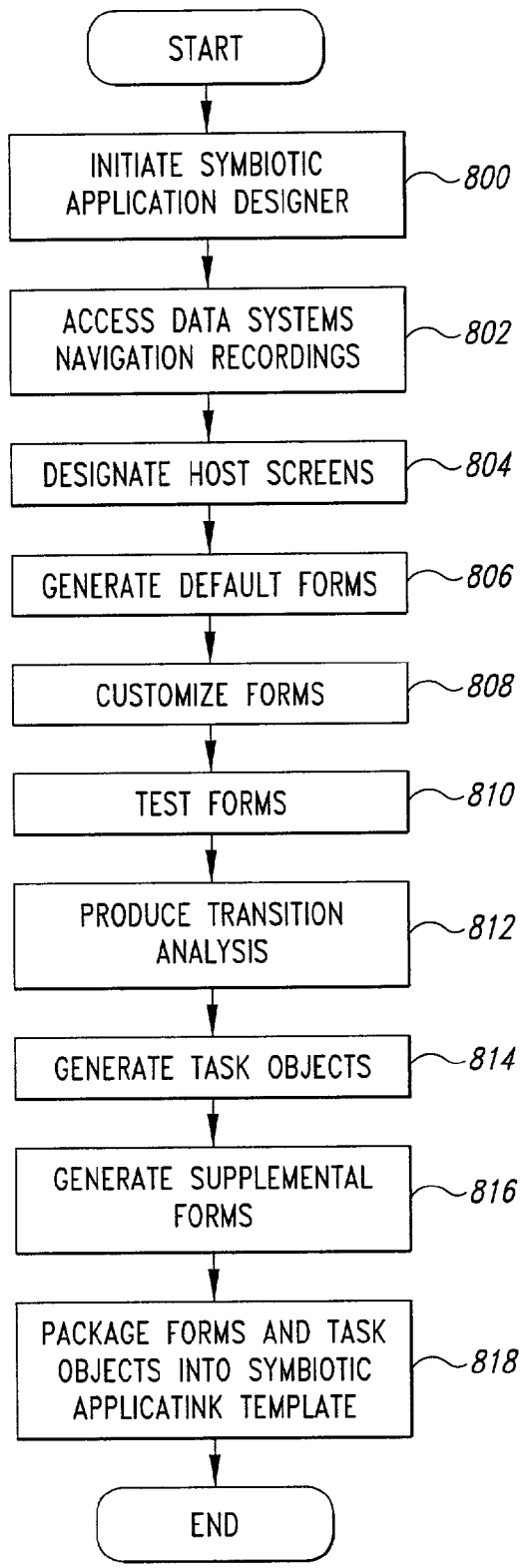
FIG. 8A is a flow chart illustrating an exemplary process used by the symbiotic computer application designer of FIG. 7 to generate a symbiotic computer application of the present invention.

As shown in FIG. 7, the symbiotic computer application designer 404, used to generate the symbiotic computer application 105, has a default user interface form generator 404a, a screen transition analyzer 404b, a user interface form designer 404c, a task object generator 404d, and a symbiotic computer application packager 404e. In an exemplary embodiment, to generate the symbiotic computer application 105, first, the symbiotic computer application designer 404 is initiated in step 800 of FIG. 8A. Here a developer would furnish input such as a desired name, description, and identification of some of the basic attributes for the symbiotic computer application 105. At times the developer may retrieve an existing symbiotic computer application 105 to create a modified version. If any data systems navigation recordings 402a have been generated by the data system recorder 402, then the symbiotic computer application designer 404 accesses the data systems navigation recordings (step 802) for use by the default user interface form generator 404a and the screen transition analyzer 404b.

The default user interface form generator 404a analyzes the data systems navigation recordings 402a to generate default user interface forms based upon predefined procedures to process the output screens, other output segments and transitions of the back-end data systems 428 captured by the data systems recorder 402. Some procedures of the default user interface form generator 404a may involve generating default user interface forms according to a one-to-one mapping of the default user interface forms with the output segments of the back-end data systems 428. In other cases, generation of default user interface forms involve merging and displaying data in ways other than found with its originating plurality of screens and other output segments of the back-end data systems 428. Developer input to the default user interface form generator 404a includes selection of screens (step 804) and other output segments to be used for generation of the default user interface forms (step 806). Selection can involve simply indicating that all screens found in the data systems navigation recordings 402a are to be used or selection can involve a detail identification of individual screens to be used.

The default user interface form generator 404a can use a set of conversion rules to automatically convert a collection screens into a collection of user interface forms. A set of conversion rules can include the following rules. As a first rule, all unprotected fields of a screen become inputs to task objects that can be executed when a user is viewing a given form. As a second rule, all protected fields of a screen can be classified as those which are static (never change) and those which are variable (change with different execution of the host application, such as a current time field).

As a third rule, all fields of a screen that are static and protected become static text of a corresponding user interface form. As a fourth rule, all fields of a given screen that are variable protected or contain data and are unprotected become outputs of those task objects that transition to the user interface form associated with the given screen. As a fifth rule, an assumption is made that all user-defined fields in protected areas of a screen are variable protected fields because if they were static, the value of these fields could be hard-coded. The default user interface form generator 404a can also store general purpose user interface forms and task objects to handle user actions for cases when a screen from the legacy host application 210 is somehow unable to be processed and there is no customization input by a developer.

In some embodiments there are two methods used to determine which protected text on a field is variable. First, the user can explicitly define a field as being variable. Second, an auto-detection method for identifying variable fields can analyze multiple data systems recordings 402a of the legacy host application 210 to find suspect fields that have different content from one data system recording to another. Examples of such fields include those which show current time and fields related to entry of user identification and password information.

The user interface form designer 404c can then be used to originate customized user interface forms and to further customize user interface forms generated by the default user interface form generator 404a (step 808). Customization of a user interface form generated by the default user interface form generator 404a can include addition, placement, or deletion of controls, changing of control attributes such as a sizing attribute, a font attribute, text descriptions, and changing the type of control used such as changing an edit box control containing a field for "true" or "false" alphanumeric data to a check box containing simplified binary data.

Customization can also be directed toward outputs such as being changed from text data to binary data. Other customization includes linking GUI controls to inputs or outputs of one or more task objects and event controls such as button activation to execution of task objects. Linking of controls also becomes a factor if a task object is customized or originated by a developer independent from the legacy host application 210. Selection of allowed paths of host screen navigation can also be tailored in the customization process. The resultant user interface forms are subsequently tested to verify proper appearance and functionality when displayed (step 810).

Testing also includes verifying according to an associated navigation recording that all the required input and output fields have not been mistakenly left out of the associated user interface form. Testing can verify that all controls on the user interface forms are associated with the correct input and output fields found on the user interface forms. Testing will also verify that desired transitions between user interface forms can be successfully accomplished and that there are no undesired duplicate fields. If tasks are recorded in a navigation recording but are later chosen as unwanted and not to be handled in the user interface form, the testing will verify that the unwanted tasks cannot be initiated by the user interface form.

Testing is often an incremental process in that not all the user interface forms may be tested at one time. Rather, as they are produced, the user interface forms can be at least partially tested and anything related to a particular first user interface form that cannot be tested due to reliance on a yet to be produced second user interface form will be tested at a later time after the second user interface form is produced. In some instances it may happen that some application portions can only be tested once all the associated user interface forms are produced.

Based on the data systems navigation recordings 402a, the screen transition analyzer 404b produces analysis (step 812) concerning transitions of the display screens or other output segments, including audio segments, of the back-end data systems 428. For instance, the data systems navigation recordings 402a generated by the data system recorder 402 could include navigation recordings of the legacy host application 210 of the legacy host data system 80 involving transitions between legacy terminal screens of the legacy host application. The transitions analysis performed by the screen transition analyzer 404b is fed into the task object generator 404d as factors in designing task objects such as with task object output corresponding to task object input.

Based upon factors including one or more of the following: the user interface forms generated by the default user interface form generator 404a and the user interface form designer 404c, the analysis produced by the screen transition analyzer 404b, and developer input, the task object generator 404d generates task objects (step 814) to perform the functions of the symbiotic computer application 105 to respond to input from an end-user and to transmit and receive data and instructions from the back-end data systems 428. Task objects can have many various functions including describing and executing associations and links between a plurality of user interface forms since typically a task object is linked to a user interface form. Task objects also can involve execution of operations that originate with, or are independent from, the legacy host application 210. Supplemental forms can then be generated (step 816) if need for the generated task objects or for the any deficiencies found during testing.

As an alternative to the above described method of generating symbiotic computer applications, transition analysis is performed and then task objects are generated. For one-to-one mapping of user interface forms to the screens of the back-end application, user interface forms can then be generated using information on screen transitions and the screens of the back-end application. For one-to-many and many-to-one mapping of user interface forms to screens of the back-end application, user interface forms are generated based upon the task object inputs, task object outputs, and the screens of the back-end application.

Once the user interface forms and task objects have been generated, the symbiotic computer application packager 404e is used to package the user interface forms and task objects into a template of the symbiotic computer application 105 (step 818) for subsequent deployment by the symbiotic computer application deployer 406 to the symbiotic computer application server 660. As part of the packaging process, a user interface form post generator 404f can determine if any unmatched task objects exist that do not have a corresponding user interface form. For example, a task object may be generated for a particular task that is not associated with the legacy host application 210 or other application that has a screen output. As shown in FIG. 7, the user interface form post generator 404f includes stored user interface form generation rules 404g, and task object temporary storage 404h.

Figure 8B:
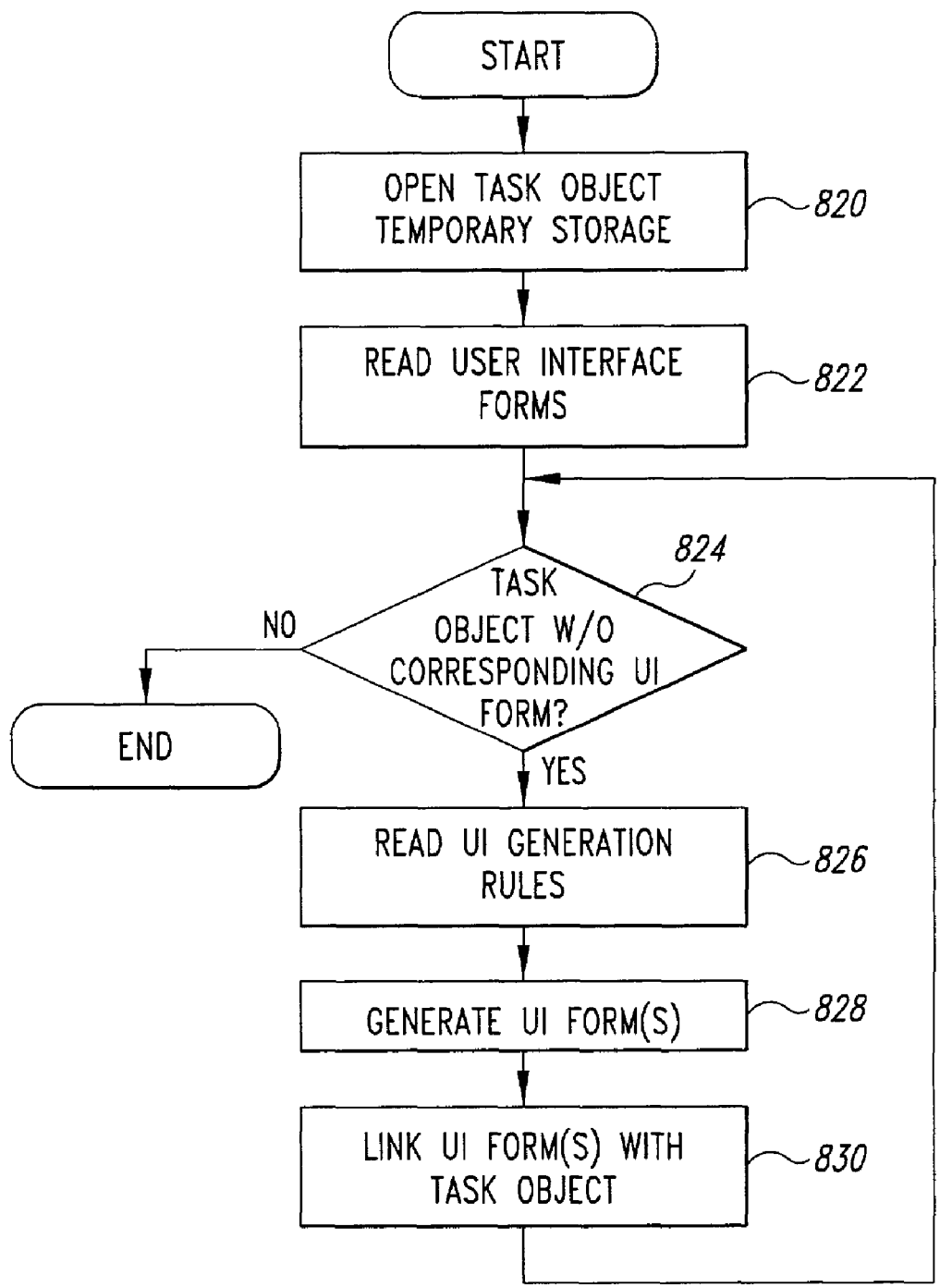
FIG. 8B is a flow chart illustrating an exemplary process used by a user interface form post generator of the symbiotic computer application packager of the symbiotic computer application designer of FIG. 7.

The user interface form post generator 404f begins its procedure by opening the task object temporary storage 404h (step 820 in FIG. 8B) and by reading the user interface forms (step 822) that have already been created either by the default user interface form generator 404a or the user interface form designer 404c. The user interface form post generator 404f then determines if a task object has no corresponding user interface form, and if not ("no" branch of step 824), ends its procedure. Otherwise, the user interface form post generator 404f first reads the stored user interface form generation rules 404g (step 826). In other embodiments, the user interface form post generator 404f may be located such that its operations is performed either separately or in a different sequence with respect to other user interface form generation as been described above. The user interface form post generator 404f then generates one or more user interface forms for one or more unmatched task objects (step 828) to address any input or output functions associated with the unmatched task objects based upon generation rules stored in the symbiotic computer application packager 404e.

Each generated user interface form is then linked to the appropriate input and output of an unmatched task object (step 830). The user interface form post generator 404f continues until all task objects in the task object temporary storage 404h have one or more corresponding user interface forms. The user interface forms generated by the user interface form post generator 404f are then packaged with the user interface forms and task objects previously generated. Testing of the entire symbiotic computer application 105 can also be part of the packaging of the forms and task objects of step 816. In other embodiments the particular steps and sequencing of steps performed by the symbiotic computer application designer 404 may vary depending upon implementation.

Figure 9:
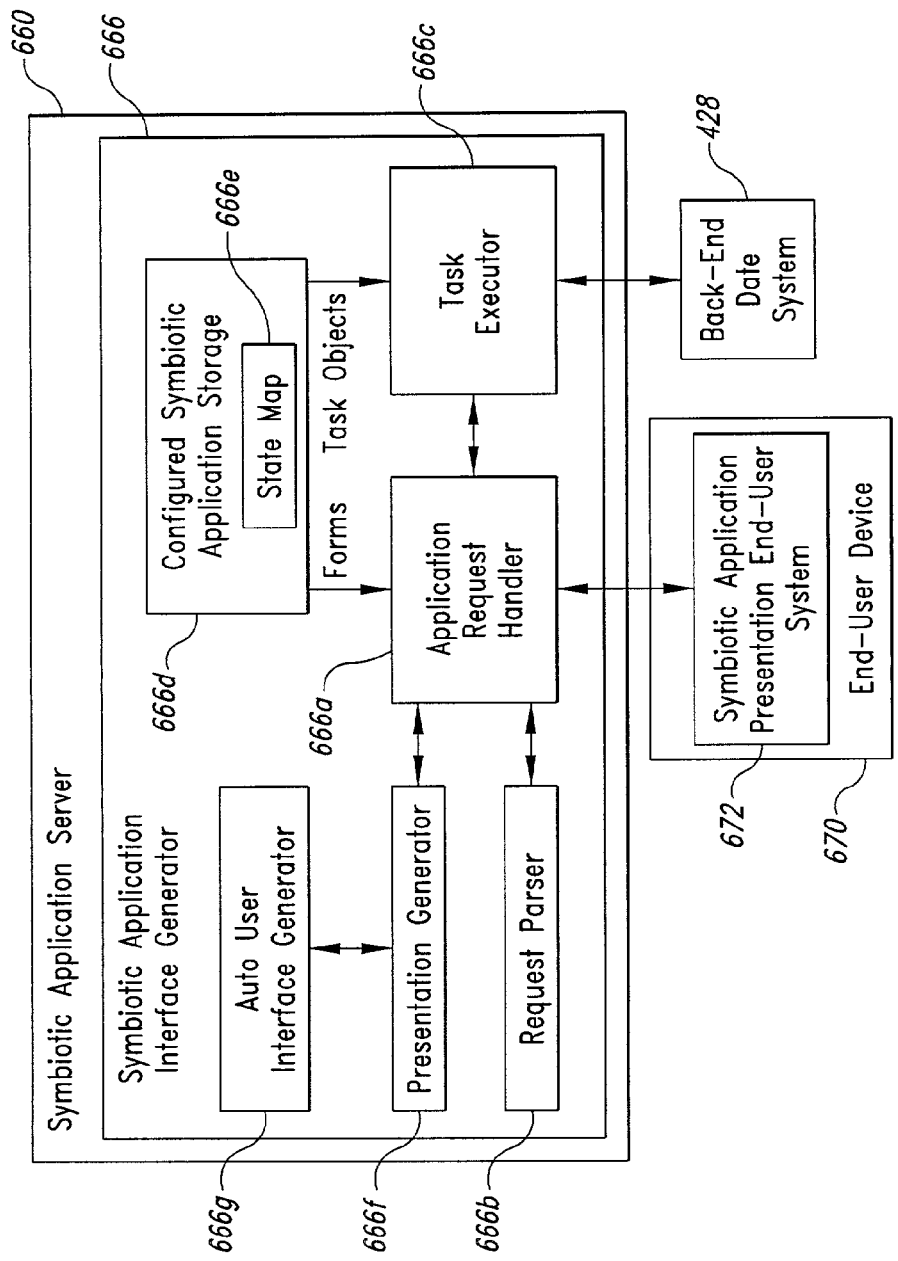
FIG. 9 is a schematic diagram illustrating details of the symbiotic computer application runtime engine of the symbiotic computer application server shown in FIG. 6.
Figure 10:
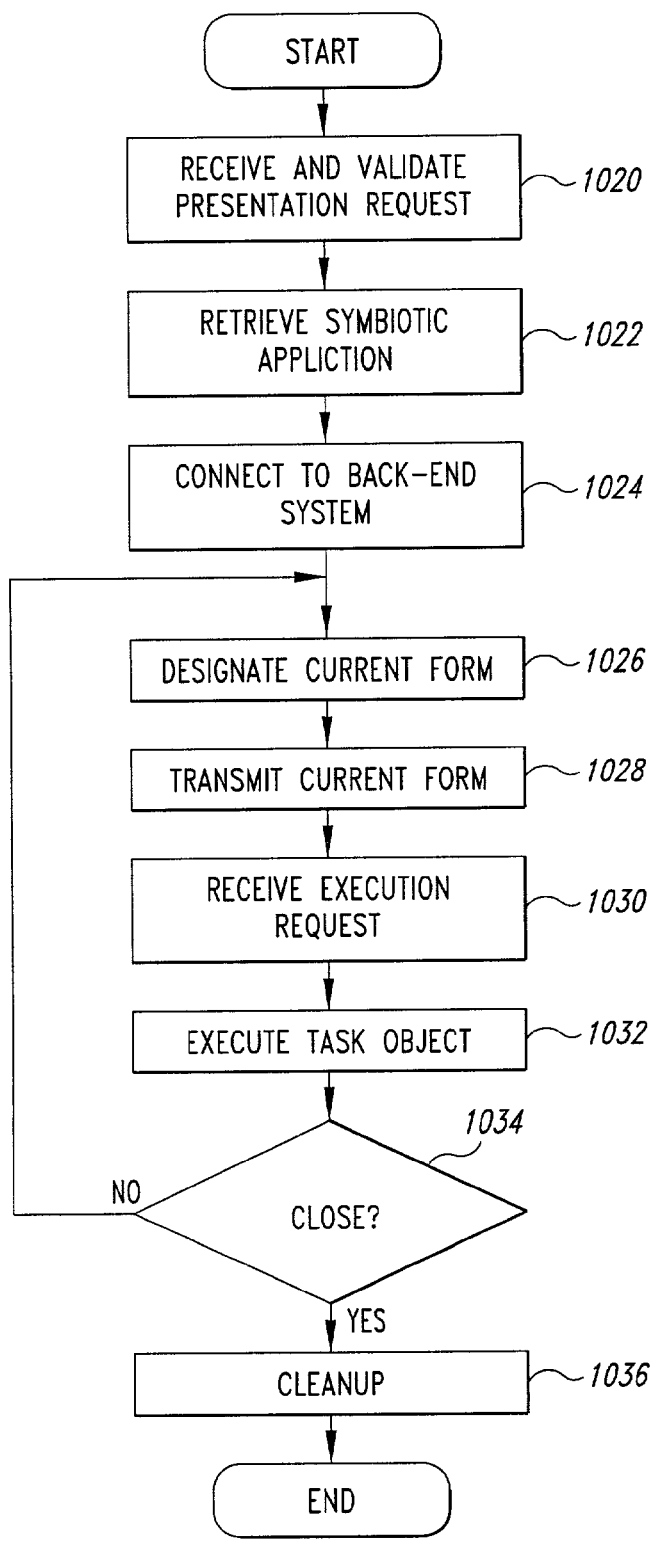
FIG. 10 is a flow chart illustrating an exemplary process used by the symbiotic computer application runtime engine of FIG. 9 to process presentation requests of a symbiotic computer application presentation end-user system of the end-user device shown in FIGS. 6 and 9.

After the symbiotic computer application 105 has been designed, deployed and configured, the symbiotic computer application runtime engine 666 is used for runtime operation of the symbiotic computer application 105 on the symbiotic computer application server 660 to provide service to the end-user device 670. As shown in FIG. 9, the symbiotic computer application runtime engine 666 includes an application request handler 666a, a request parser 666b, a task executor 666c, a configured symbiotic computer application storage 666d with state map 666e, a presentation generator 666f, and an auto user interface form generator 666g. During operation, the application request handler 666a of the symbiotic computer application runtime engine 666 receives and in conjunction with the request parser 666b, validates presentation requests for a symbiotic computer application from the symbiotic computer application presentation end-user system 672 in step 1020 of FIG. 10. For instance, in a browser environment, the symbiotic computer application presentation end-user system 672 may be integrated into a browser such that a request is generated and sent to the symbiotic computer application runtime engine by a user activating a web page link through operation of a pointing device such as the mouse 94. In some embodiments, such as with network implementations, the symbiotic computer application presentation end-user system 672 may implement a caching scheme so that after an initial download of a user interface form description and static data, only updated dynamic data would need to be sent from the symbiotic computer application runtime engine 666.

Upon validation that the requested symbiotic computer application is being stored in a configured form in the configured symbiotic computer application storage 666d, the application request handler 666a sends a form retrieval request having state information to the configured symbiotic computer application storage (step 1022). Subsequent to receipt of the form retrieval request, the configured symbiotic computer application storage 666d uses the state map 666e to identify one or more user interface forms associated with the requested symbiotic computer application 105 to subsequently send to the application request handler 666a and to identify one or more task objects to subsequently send to the task executor 666c. In an alternative embodiment, user interface forms are generated using a rules engine and sent to the symbiotic computer application presentation end-user system 672.

Data displayed in a user interface form is either static data or dynamic data that is furnished to the form controls by task objects. The configured symbiotic computer application storage 666d sends all the user interface forms and static data associated with the requested symbiotic computer application 105 to the application request handler 666a in one transmission and sends all the task objects associated with the requested symbiotic computer application 105 to the task executor 666c in one transmission. The dynamic data associated with the user interface forms is sent to the application request handler 666a by the task executor 666c. In other embodiments, the user interface forms and the task objects are sent by the configured symbiotic computer application storage 666d in pluralities of transmissions. In other embodiments, individual components can be merged into an overall component. For instance, the configured symbiotic computer application storage 666d can be combined with the task executor 666c into one component.

Upon receipt of one or more task objects associated with the requested symbiotic computer application 105 including one or more initiation task objects, the task executor 666c establishes a connection to the one or more back-end systems 428 (step 1024) according to communication information contained within the one or more initiation task objects. These connections may be pre-initialized so that they are allocated from a pool to increase access efficiencies. Alternatively, the symbiotic computer application presentation end-user system 672 can be configured to generate default user interface forms based upon one of the recently accessed screens of the legacy host application 210. Based upon the one or more task objects received, the task executor 666c also sends instructions to the application request handler 666a to designate a particular user interface form as a current form (step 1026). The application request handler 666a then sends the current user interface form (step 1028) to the symbiotic computer application presentation end-user system 672 of the end-user device 670 to generate output by the device output 674.

Generally, the application request handler 666a will then wait until it receives an execution request (step 1030) from the symbiotic computer application presentation end-user system 672 to execute a task. Once an execution request is received, the application request handler 666a forwards the request to the task executor 666c, which subsequently executes the one or more task objects (step 1032) associated with the execution request. If the execution request includes a request to close the symbiotic computer application ("Yes" of step 1034), then the task executor initiates cleanup procedures (step 1036), which includes closing of the communication link between the back-end data system 428. Otherwise ("No" of step 1034), based upon instructions received from the task executor 666c, the application request handler 666a designates another user interface form as the current form (step 1026).

Figure 11:
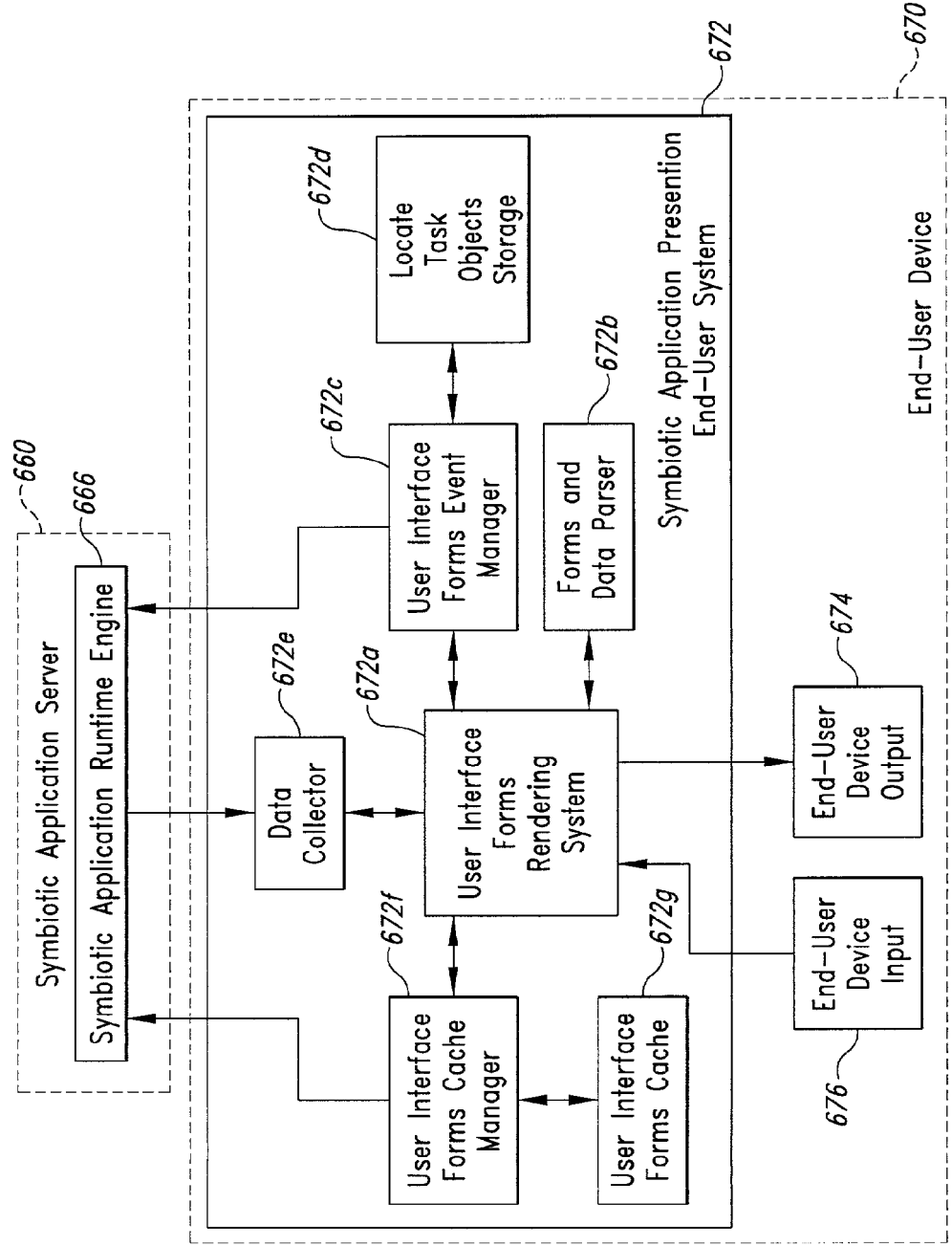
FIG. 11 is a schematic diagram illustrating details of the symbiotic computer application presentation end-user system of the end-user device shown in FIGS. 6 and 9.
Figure 12:
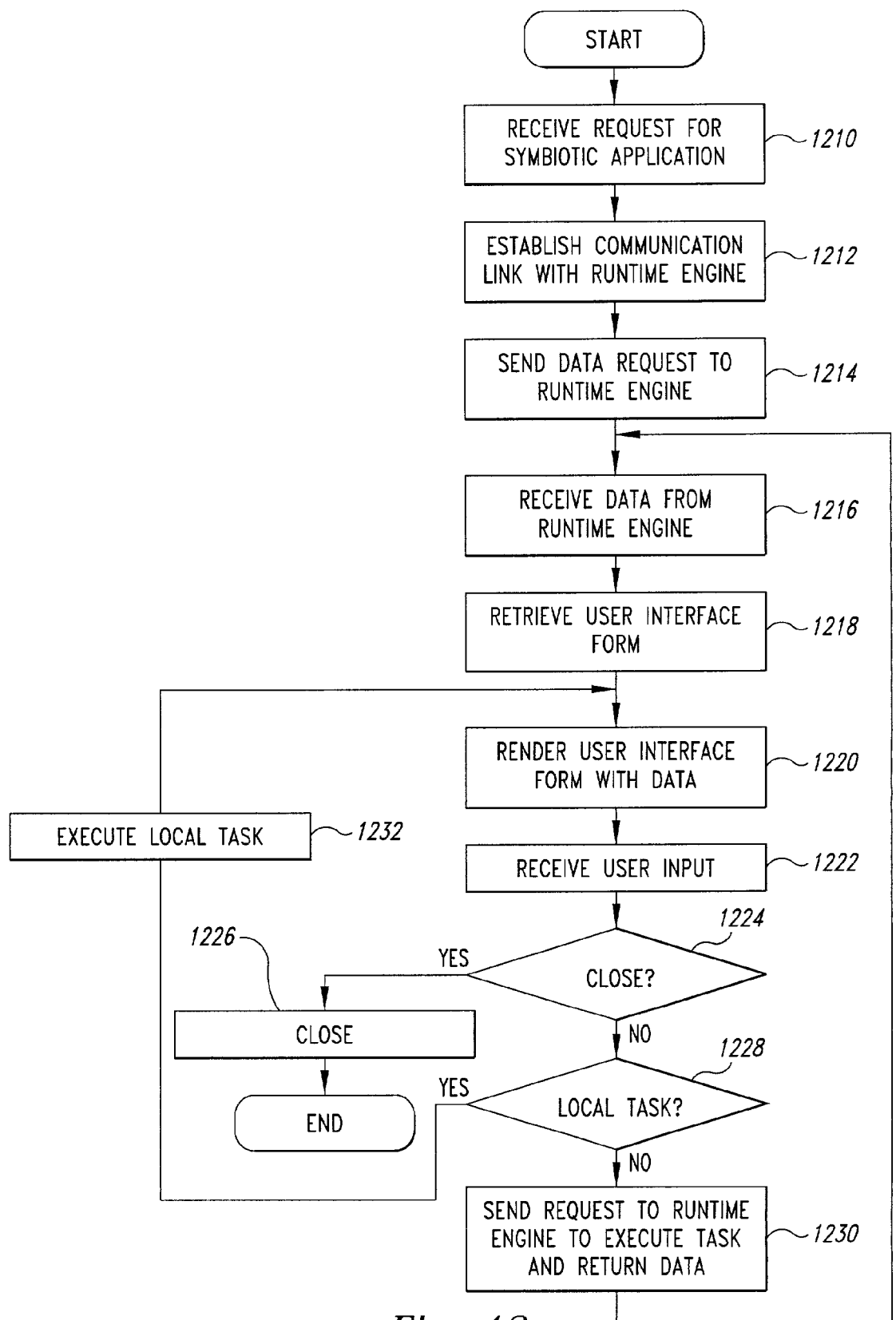
FIG. 12 is a flow chart illustrating an exemplary process used by the symbiotic computer application presentation end-user system to service requests associated with the symbiotic computer application of the present invention.

The symbiotic computer application presentation end-user system 672 includes a user interface forms rendering system 672a, a forms and data parser 672b, a user interface forms event manager 672c, a local task objects storage 672d containing preprogrammed task objects routinely used by the symbiotic computer application presentation end-user system, a data collector 672e, a user interface forms cache manager 672f, and a user interface forms cache 672g, as shown in FIG. 11. The user interface forms rendering system 672a receives a request for a symbiotic computer application in step 1210 of FIG. 12 from the end-user device input 676 whereby the forms and data parser 672b analyzes the symbiotic computer application request to parse out request information related to user interface forms and request information related to data and task objects. This approach could be used, for instance, when an HTML browser is used with the application presentation end-user system 672. In alternative embodiments, a separate user interface form application running on the end-user device 670 could activate a locally stored version or a downloadable version of the symbiotic computer application presentation end-user system 672. As an example, a downloadable version of the symbiotic computer application presentation end-user system 672 could be written as a Java applet.

Based on the analysis performed by the forms and data parser 672b, the request is sent to the user interface forms event manager 672c. The user interface forms event manager 672c relies upon preprogrammed one or more task objects stored in the local task objects storage 672d to formulate and send a request to establish a communications link (step 1212) with the symbiotic computer application runtime engine 666. The local task object storage 672d also includes task objects that are typically used to perform simple validations and manipulations of data or other features that would be built into the symbiotic computer application presentation end-user system 672. After the communications link has been established, the symbiotic computer application presentation end-user system 672 sends a data request (step 1214) from the user interface forms event manager 672d to the symbiotic computer application runtime engine 666. Alternative embodiments could use conventional techniques to establish communication between the symbiotic computer application server 660 and the end-user device 670.

In response to the data request, the data collector 672e of the symbiotic computer application presentation end-user system 672 receives data (step 1216) from the symbiotic computer application runtime engine 666. The data collector 672e passes on the received data to the user interface forms rendering system 672a, which then sends a request to the user interface forms cache manager 672f to retrieve a user interface form (step 1218) associated with the data received from the symbiotic computer application runtime engine 666. The user interface forms cache manager 672f first checks the user interface forms cache 672g to determine if the associated user interface form is currently stored in the user interface forms cache. If the associated user interface form is not currently present in the user interface forms cache 672g, then the user interface forms cache manager 672f sends a request to the symbiotic computer application runtime engine 666 for the user interface form associated with the received data.

Upon retrieval of the user interface form, the user interface forms rendering system 672a renders the retrieved user interface form with the received data (step 1220) and sends the rendered user interface form to the end-user device output 674 of the end-user device 670. In some embodiments, the end-user device output 674 is the monitor 48 displaying a GUI and the end-user device 670 is the client computer 10 that is running, for instance, a browser that supports HTML and Java or Visual Basics scripting languages, so that user interface forms would then be HTML forms with some client scripting built into them. Alternative embodiments utilize a wireless markup language when, for instance, the end-user device 670 is a wireless communication device such as a wireless telephone, in particular, a cellular telephone. Other embodiments utilize such devices as a personal digital assistant, a paging device, a laptop computer, a digital television, an Internet appliance, or a digital presentation monitor.

Generally, the end-user device will then wait to receive a request or other response from the end-user device input 676 based upon user input. Upon receipt of user input (step 1222) from the end-user device input 676, through the user interface forms rendering system 672a and the forms and data parser 672b, the user interface forms event manager 672c will determine if the user input is a close request (step 1224) and if so ("Yes" of step 1224) will send a task request to the symbiotic computer application runtime engine 666 to close down operation of the symbiotic computer application 105 (step 1226) and will cease the communication link between the symbiotic computer application server 660 and the end-user system 670.

If the user input is a not a close request ("No" of step 1224), then the user interface forms event manager 672c will determine (step 1228) if the one or more task requests associated with the user input can be serviced by the local task objects storage in the local task objects storage 672d. If so ("Yes" of step 1228), the user interface forms event manager 672c executes the local task object (step 1232) and the user interface forms rendering system 672a then renders the user interface form and data associated with execution of the task object. Otherwise ("No" of step 1228), the user interface forms event manager 672c sends a request (step 1230) to the symbiotic computer application runtime engine 666 to execute the task and return data to the end-user device 670.

From the foregoing it will be appreciated that, although specific embodiments of the invention have been described herein for purposes of illustration, various modifications may be made without deviating from the spirit and scope of the invention. Accordingly, the invention is not limited except as by the appended claims.

It is claimed:

1. A computer application designer computer system to generate computer applications for communication between an end-user device having an input and an output and a back-end data system having a back-end application, the computer application designer computer system comprising:
   at least one processor; and
   at least one computer-readable storage medium that stores instructions executable by the at least one processor and which when executed by the at least one processor causes the at least one processor to implement:
   a user interface form generator configured to receive and analyze data system navigation recordings associated with the back-end application of the back-end data system, the user interface form generator configured to generate default user interface forms based upon predefined procedures to process the data system navigation recordings including those related to output screens, other output segments, and screen transitions of the back-end data system, the default user interface forms configured to operate with the end-user device to present controls and data fields to the output of the end-user device and to receive data from the input of the end-user device; and
   a task object generator configured to generate task objects to respond to input from the end-user device, to transmit data to the back-end data system and to receive data from the back-end data system, the task object generator configured to generate the task objects based at least in part upon the controls and data fields of the default user interface forms generated by the user interface form generator and the data system navigation recordings including those related to the output screens and screen transitions of the back-end data system, each of the task objects having one or more task object inputs, task object outputs, and transfer functions, the one or more transfer functions configured to operate on the task object inputs to result in the task object outputs, some of the plurality of task objects having one or more first discrete associations with one or more of the default user interface forms, the first discrete associations including receiving data from one or more of the default user interface forms as one or more of the task object inputs and sending data to one or more of the default user interface forms as one or more of the task object outputs, some of the task objects having one or more second discrete associations with the back-end application including receiving data from the back-end application as one or more of the task object inputs and sending data to the back-end application as one or more of the task object outputs,
   wherein the user interface form generator is configured to generate the default user interface forms according to the following rules: all unprotected fields of output screens of the back-end application become inputs to task objects to be executed when a user is viewing at least one of the default user interface forms, all protected fields of the output screens are classified as one of the following: static and dynamic, all fields of at least one of the output screens that are static and protected become static text of one of the default user interface forms, all fields of at least one of the output screens that are variable protected become outputs of those task objects that transition to the default user interface form associated with the output screen, each field of the output screens that is unprotected and contains data becomes output of those task objects that transition to the default user interface form linked to the output screen of the field, and all end-user defined fields in protected areas of the screen are variable protected fields.

2. The computer application designer computer system of claim 1 wherein the task object generator is further configured to generate task objects based upon developer input.

3. The computer application designer computer system of claim 1 for use with the output of the end-user device including audio output, wherein the user interface form generator generates the default user interface forms to operate with the audio output.

4. The computer application designer computer system of claim 1 wherein the user interface form generator is configured to generate the default user interface forms according to a one-to-one mapping of the default user interface forms with output screens of the back-end application.

5. The computer application designer computer system of claim 1 wherein the one or more of the transfer functions of the task objects involve execution of operations independent from operations of the back-end data system.

6. The computer application designer computer system of claim 1 wherein the user interface form generator is further configured to determine which protected text on a data field is variable based upon one of the following: analysis of multiple data system recordings to find suspect fields that have different content from one data system recording to another and an explicit definition of a field as being variable.

7. The computer application designer computer system of claim 1 wherein the user interface form generator is further configured to generate the default user interface forms by merging and displaying data in ways other than found with the output screens, the other output segments, and the screen transitions of the back-end data system.

8. The computer application designer computer system of claim 1 wherein the user interface form generator is configured to receive developer input and modify generating of the default user interface forms related to data fields and controls, the developer input including at least one of the following: selection of output screens and other output segments of the back-end data system.

9. The computer application designer computer system of claim 1 wherein the instructions when executed by the at least one processor causes the at least one processor to implement: a user interface form designer configured to generate input based user interface forms based upon developer input and previously generated default user interface forms received by the default user interface form designer.

10. The computer application designer computer system of claim 1 wherein the instructions when executed by the at least one processor causes the at least one processor to implement: a screen transition analyzer configured to produce analysis concerning transitions between display screens and between other output segments of the back-end data system.

11. The computer application designer computer system of claim 10 wherein the task object generator is further configured to generate task objects based upon the analysis of the screen transition analyzer.

12. The computer application designer computer system of claim 1 wherein the instructions when executed by the at least one processor causes the at least one processor to implement: a user interface form designer configured to modify the default user interface forms based upon developer input.

13. The computer application designer computer system of claim 12 wherein the user interface form designer is configured to add and delete controls on the default user interface forms.

14. The computer application designer computer system of claim 12 wherein the controls on the default user interface forms include at least one of the following: a sizing attribute, a font attribute, and text descriptions contained within the control.

15. The computer application designer computer system of claim 12 wherein the user interface form designer is configured to specify the type of the controls found on the default user interface forms, the control type including controls having an edit box having alphanumeric data and a check box having binary data.

16. The computer application designer computer system of claim 12 wherein the user interface form designer is configured to specify the type of data associated with outputs of the default user interface forms.

17. The computer application designer computer system of claim 12 wherein the user interface form designer is further configured to allow selection of output screens of the back-end application for navigation of the back-end application by the task objects as linked to the default user interface forms.

18. The computer application designer computer system of claim 12 wherein the user interface form designer is configured to link controls of the default user interface forms to one or more inputs and outputs of the task objects.

19. The computer application designer computer system of claim 18 wherein the linking of the controls by the user interface form designer includes button activation on one or more of the default user interface forms to execute transfer functions of one or more of the task objects.

20. The computer application designer computer system of claim 1 wherein the instructions when executed by the at least one processor causes the at least one processor to implement: a computer application packager configured to package the default user interface forms and task objects into a computer application template.

21. The computer application designer computer system of claim 20 wherein the instructions when executed by the at least one processor causes the at least one processor to implement: a computer application deployer configured to deploy the computer application template to a server computer configured to configure the computer application template for operation on the server computer.

22. The computer application designer computer system of claim 20 wherein the computer application packager is further configured to test controls and data fields of the default user interface forms and to test transitions based upon association links between the default user interface forms and the task objects.

23. A method of operating a computer system having at least one processor and at least one computer-readable storage medium that stores instructions executable by the at least one processor for generating computer applications for communication between an end-user device having an input and an output and a back-end data system having a back-end application, the method comprising:
  analyzing, by the computer system, data system navigation recordings associated with the back-end application of the back-end data system regarding host screens and screen transitions of the back-end application;
  generating, by the computer system, user interface forms based upon predefined procedures to process the data system navigation recordings, the user interface forms configured to operate with the end-user device to present controls and data fields to the output of the end-user device and to receive data from the input of the end-user device; and generating task objects, by the computer system, to respond to input from the end-user device, to transmit data to the back-end data system and to receive data from the back-end data system, the task objects being generated based at least in part on the controls and data fields of the generated user interface forms, each of the task objects having one or more task object inputs, task object outputs, and transfer functions, the one or more transfer functions configured to operate on the task object inputs to result in the task object outputs, some of the plurality of task objects having one or more first discrete associations with one or more of the user interface forms, the first discrete associations including receiving data from one or more of the user interface forms as one or more of the task object inputs and sending data to one or more of the user interface forms as one or more of the task object outputs, some of the task objects having one or more second discrete associations with the back-end application including receiving data from the back-end application as one or more of the task object inputs and sending data to the back-end application as one or more of the task object outputs, wherein the user interface forms are generated according to the following rules: all unprotected fields of output screens of the back-end application become inputs to task objects to be executed when a user is viewing at least one of the user interface forms, all protected fields of the output screens are classified as one of the following: static and dynamic, all fields of at least one of the output screens that are static and protected become static text of one of the user interface forms, all fields of at least one of the output screens that are variable protected become outputs of those task objects that transition to the user interface form associated with the output screen, each field of the output screens that is unprotected and contains data becomes output of those task objects that transition to the user interface form linked to the output screen of the field, and all end-user defined fields in protected areas of the screen are variable protected fields.

24. The method of claim 23 wherein generating task objects is based upon at least one of the following: the analysis of the data system navigation recordings, and developer input.

25. The method of claim 23 wherein generating the user interface forms is done according to a one-to-one mapping of the user interface forms with output screens of the back-end application.

26. The method of claim 23 wherein the transfer functions of the task objects include operations independent from operations of the back-end application.

27. The method of claim 23, further including determining, by the computer system, which protected text on a data field is variable based upon one of the following: user-input and analysis of multiple data system recordings to find suspect fields that have different content from one data system recording to another, and an explicit definition of a field as being variable.

28. The method of claim 23, further including receiving, by the computer system, developer input regarding data input fields and controls to be used with the user interface forms and generating the user interface forms and task objects based in part on the developer input.

29. The method of claim 23 wherein generating user interface forms includes merging and displaying data in ways other than found with the output screens, the other output segments, and the screen transitions of the back-end data system.

30. The method of claim 23 wherein the system navigation recordings include output screens, other output segments, and screen transitions of the back-end application.

31. The method of claim 23, further including generating user interface forms, by the computer system, based upon developer input and previously generated user interface forms.

32. The method of claim 31, further including specifying, by the computer system, control types including controls with an edit box having alphanumeric data and controls with a check box having binary data.

33. The method of claim 31, further including specifying, by the computer system, the type of data associated with outputs of the user interface forms.

34. The method of claim 31, further including modifying user interface forms, by the computer system, based upon developer input, the modifying including adding and deleting controls on one or more of the user interface forms.

35. The method of claim 34 wherein the controls on the user interface forms include at least one of the following: a sizing attribute, a font attribute, and text descriptions contained within the control.

36. The method of claim 31, further including linking, by the computer system, controls on one or more of the user interface forms to one or more inputs and outputs of the task objects.

37. The method of claim 36 wherein the linking of controls includes button activation to execute transfer functions of the task objects.

38. The method of claim 36, further including selecting, by the computer system, output screens of the back-end application for navigation of the back-end application by the task objects according to how the controls of the user interface forms are linked to the task objects.

39. The method of claim 23 wherein the user interface forms are generated to operate with an audio output of the end-user device.

40. The method of claim 23, further including packaging, by the computer system, the user interface forms and task objects into a computer application template.

41. The method of claim 40, further including deploying the computer application template to a server computer, by the computer system, to configure the computer application template for operation on the server computer.

42. The method of claim 40, further including testing, by the computer system, controls and data fields of the user interface forms and testing, by the computer system, transitions between the user interface forms based upon association links between the user interface forms and the task objects.

43. A method of operating a computer system having at least one processor and at least one computer-readable storage medium that stores instructions executable by the at least one processor for generating computer applications for communication between an end-user device having an input and an output and a back-end data system having a back-end application, the method comprising:

generating, by the computer system, a plurality of user interface forms based upon one or more of the following: designating host screens described by data system navigation recordings, developer input regarding customization of designated host screens described by data system navigation recordings, and developer input regarding placement on the user interface forms of controls and data fields other than those found on host screens of data system navigation recordings, the user interface forms configured to operate with the end-user device to present controls and data fields to the output of the end-user device and to receive data from the input of the end-user device; and generating, by the computer system, task objects to respond to input from the end-user device and to transmit and receive data from the back-end data system, the task object objects being generated based at least in part upon the controls and data fields of the plurality of generated user interface forms and each of the task objects having one or more task object inputs, task object outputs, and transfer functions, the one or more transfer functions configured to operate on the task object inputs to result in the task object outputs, some of the plurality of task objects having one or more first discrete associations with one or more of the user interface forms, the first discrete associations including receiving data from one or more of the user interface forms as one or more of the task objects inputs and sending data to one or more of the user interface forms as one or more of the task object outputs, some of the task objects having one or more second discrete associations with the back-end application including receiving data from the back-end application as one or more of the task object inputs and sending data to the back-end application as one or more of the task object outputs, wherein the plurality of user interface forms are generated according to the following rules: all unprotected fields of output screens of the back-end application become inputs to task objects to be executed when a user is viewing at least one of the user interface forms, all protected fields of the output screens are classified as one of the following: static and dynamic, all fields of at least one of the output screens that are static and protected become static text of one of the user interface forms, all fields of at least one of the output screens that are variable protected become outputs of those task objects that transition to the user interface form associated with the output screen, each field of the output screens that is unprotected and contains data becomes output of those task objects that transition to the user interface form linked to the output screen of the field, and all end-user defined fields in protected areas of the screen are variable protected fields.

44. A computer-readable memory medium containing instructions executable by at least one processor of a computer system that cause the computer system to communicate between an end-user device having an input and an output and a back-end data system having a back-end application by:

analyzing data system navigation recordings associated with the back-end application of the back-end data system regarding host screens and screen transitions of the back-end application;

generating user interface forms based upon predefined procedures to process the data system navigation recordings, the user interface forms configured to operate with the end-user device to present controls and data fields to the output of the end-user device and to receive data from the input of the end-user device; and generating task objects to respond to input from the end-user device, to transmit data to the back-end data system and to receive data from the back-end data system, the generating task objects based at least in part on the controls and data fields of the generated user interface forms and each of the task objects having one or more task object inputs, task object outputs, and transfer functions, the one or more transfer functions configured to operate on the task object inputs to result in the task object outputs, some of the plurality of task objects having one or more first discrete associations with one or more of the user interface forms, the first discrete associations including receiving data from one or more of the user interface forms as one or more of the task object inputs and sending data to one or more of the user interface forms as one or more of the task object outputs, some of the task objects having one or more second discrete associations with the back-end application including receiving data from the back-end application as one or more of the task object inputs and sending data to the back-end application as one or more of the task object outputs, wherein the user interface forms are generated according to the following rules: all unprotected fields of output screens of the back-end application become inputs to task objects to be executed when a user is viewing at least one of the user interface forms, all protected fields of the output screens are classified as one of the following: static and dynamic, all fields of at least one of the output screens that are static and protected become static text of one of the user interface forms, all fields of at least one of the output screens that are variable protected become outputs of those task objects that transition to the user interface form associated with the output screen, each field of the output screens that is unprotected and contains data becomes output of those task objects that transition to the user interface form linked to the output screen of the field, and all end-user defined fields in protected areas of the screen are variable protected fields.

45. The computer-readable memory medium of claim 44 wherein generating task objects is based upon at least one of the following: the analysis of the data system navigation recordings, and developer input.

46. The computer-readable memory medium of claim 44 wherein generating the user interface forms is done according to a one-to-one mapping of the user interface forms with output screens of the back-end application.

47. The computer-readable memory medium of claim 44 wherein the transfer functions of the task objects include operations independent from operations of the back-end application.

48. The computer-readable memory medium of claim 44 wherein the instructions cause the computer system to communicate, further by: determining which protected text on a data field is variable based upon one of the following: user input and analysis of multiple data system recordings to find suspect fields that have different content from one data system recording to another, and an explicit definition of a field as being variable.

49. The computer-readable memory medium of claim 44 wherein the instructions cause the computer system to communicate, further by: receiving developer input regarding data input fields and controls to be used with the user interface forms and generating the user interface forms and task objects based in part on the developer input.

50. The computer-readable memory medium of claim 44 wherein generating user interface forms includes merging and displaying data in ways other than found with the output screens, the other output segments, and the screen transitions of the back-end data system.

51. The computer-readable memory medium of claim 44 wherein the system navigation recordings include output screens, other output segments, and screen transitions of the back-end application.

52. The computer-readable memory medium of claim 44 wherein the instructions cause the computer system to communicate, further by: generating user interface forms based upon developer input and previously generated user interface forms.

53. The computer-readable memory medium of claim 52 wherein the instructions cause the computer system to communicate, further by: specifying control types including controls with an edit box having alphanumeric data and controls with a check box having binary data.

54. The computer-readable memory medium of claim 52 wherein the instructions cause the computer system to communicate, further by: specifying the type of data associated with outputs of the user interface forms.

55. The computer-readable memory medium of claim 52 wherein the instructions cause the computer system to communicate, further by: modifying user interface forms based upon developer input, the modifying including adding and deleting controls on one or more of the user interface forms.

56. The computer-readable memory medium of claim 55 wherein the controls on the user interface forms include at least one of the following: a sizing attribute, a font attribute, and text descriptions contained within the control.

57. The computer-readable memory medium of claim 52 wherein the instructions cause the computer system to communicate, further by: linking controls on one or more of the user interface forms to one or more inputs and outputs of the task objects.

58. The computer-readable memory medium of claim 57 wherein the linking of controls includes button activation to execute transfer functions of the task objects.

59. The computer-readable memory medium of claim 57 wherein the instructions cause the computer system to communicate, further by: selecting output screens of the back-end application for navigation of the back-end application by the task objects according to how the controls of the user interface forms are linked to the task objects.

60. The computer-readable memory medium of claim 44 wherein the user interface forms are generated to operate with an audio output of the end-user device.

61. The computer-readable memory medium of claim 44 wherein the instructions cause the computer system to communicate, further by: packaging the user interface forms and task objects into a computer application template.

62. The computer-readable memory medium of claim 61 wherein the instructions cause the computer system to communicate, further by: deploying the computer application template to a server computer to configure the computer application template for operation on the server computer.

63. The computer-readable memory medium of claim 61 wherein the instructions cause the computer system to communicate, further by: testing controls and data fields of the user interface forms and testing transitions between the user interface forms based upon association links between the user interface forms and the task objects.

64. A computer-readable memory medium containing instructions executable by at least one processor of a computer system that cause the computer system to communicate between an end-user device having an input and an output and a back-end data system having a back-end application by:

generating a plurality of user interface forms based upon one or more of the following: designating host screens described by data system navigation recordings, developer input regarding customization of designated host screens described by data system navigation recordings, and developer input regarding placement on the user interface forms of controls and data fields other than those found on host screens of data system navigation recordings, the user interface forms configured to operate with the end-user device to present controls and data fields to the output of the end-user device and to receive data from the input of the end-user device; and generating task objects to respond to input from the end-user device and to transmit and receive data from the back-end data system, the task objects being generated based at least in part upon the controls and data fields of the plurality of generated user interface forms and each of the task objects having one or more task object inputs, task object outputs, and transfer functions, the one or more transfer functions configured to operate on the task object inputs to result in the task object outputs, some of the plurality of task objects having one or more first discrete associations with one or more of the user interface forms, the first discrete associations including receiving data from one or more of the user interface forms as one or more of the task objects inputs and sending data to one or more of the user interface forms as one or more of the task object outputs, some of the task objects having one or more second discrete associations with the back-end application including receiving data from the back-end application as one or more of the task object inputs and sending data to the back-end application as one or more of the task object outputs, wherein the plurality of user interface forms are generated according to the following rules: all unprotected fields of output screens of the back-end application become inputs to task objects to be executed when a user is viewing at least one of the user interface forms, all protected fields of the output screens are classified as one of the following: static and dynamic, all fields of at least one of the output screens that are static and protected become static text of one of the user interface forms, all fields of at least one of the output screens that are variable protected become outputs of those task objects that transition to the user interface form associated with the output screen, each field of the output screens that is unprotected and contains data becomes output of those task objects that transition to the user interface form linked to the output screen of the field, and all end-user defined fields in protected areas of the screen are variable protected fields.

* * * * *